/

US010079822B2

(12) United States Patent
Stojanovski et al.

(10) Patent No.: US 10,079,822 B2
(45) Date of Patent: Sep. 18, 2018

(54) TECHNIQUES FOR SECURELY RECEIVING CRITICAL COMMUNICATION CONTENT ASSOCIATED WITH A CRITICAL COMMUNICATION SERVICE

(71) Applicant: Intel IP Corporation, Santa Clara, CA (US)

(72) Inventors: Alexandre S. Stojanovski, Paris (FR); Muthaiah Venkatachalam, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 17 days.

(21) Appl. No.: 14/670,233

(22) Filed: Mar. 26, 2015

(65) Prior Publication Data

US 2016/0344726 A1 Nov. 24, 2016

Related U.S. Application Data

(60) Provisional application No. 62/019,309, filed on Jun. 30, 2014.

(51) Int. Cl.
  *H04L 29/06* (2006.01)
  *H04W 76/14* (2018.01)
  (Continued)

(52) U.S. Cl.
  CPC ........ *H04L 63/0823* (2013.01); *H04L 9/3247* (2013.01); *H04W 4/10* (2013.01);
  (Continued)

(58) Field of Classification Search
  CPC ............... H04L 63/0823; H04L 9/3294; H04L 63/0442; G06F 21/10; G06F 21/33
  (Continued)

(56) References Cited

U.S. PATENT DOCUMENTS

2004/0049676 A1* 3/2004 Dutertre ............... H04L 63/061
                                                     713/163
2010/0227611 A1* 9/2010 Schmidt ................. H04W 4/06
                                                     455/434

(Continued)

FOREIGN PATENT DOCUMENTS

JP          2009212777 A        9/2009
JP          2010171635 A        8/2010
                (Continued)

OTHER PUBLICATIONS

3rd Generation Partnership Project (3GPP), "Technical Specification Group Services and System Aspects; Mission Critical Push to Talk MCPTT; (Release 13)," 3GPP TS 22.179 V0.4.0, May 2014, 25 pages.*

(Continued)

*Primary Examiner* — Farid Homayounmehr
*Assistant Examiner* — Sanchit Sarker
(74) *Attorney, Agent, or Firm* — Compass IP Law PC

(57) ABSTRACT

Examples may include techniques for securely receiving critical communication content associated with a critical communication service. Examples may include a network providing the critical communication being capable of establishing a secure connection to remote user equipment (UE) through a relay UE in order for the remote UE to securely receive critical communication content from the network. The critical communication service may include a mission critical push to talk (MCPTT) service.

28 Claims, 15 Drawing Sheets

(51) Int. Cl.

| | | |
|---|---|---|
| *H04W 76/10* | (2018.01) | |
| *H04W 12/04* | (2009.01) | |
| *H04W 12/08* | (2009.01) | |
| *H04W 76/02* | (2009.01) | |
| *H04W 80/10* | (2009.01) | |
| *H04W 4/10* | (2009.01) | |
| *H04L 9/32* | (2006.01) | |
| *H04W 8/00* | (2009.01) | |
| *H04W 60/04* | (2009.01) | |
| *H04W 88/04* | (2009.01) | |
| *H04L 12/18* | (2006.01) | |

(52) U.S. Cl.
CPC .......... *H04W 8/005* (2013.01); *H04W 12/04* (2013.01); *H04W 12/08* (2013.01); *H04W 60/04* (2013.01); *H04W 76/02* (2013.01); *H04W 76/023* (2013.01); *H04W 76/10* (2018.02); *H04W 76/14* (2018.02); *H04W 80/10* (2013.01); *H04L 12/189* (2013.01); *H04L 63/061* (2013.01); *H04L 63/0869* (2013.01); *H04W 88/04* (2013.01)

(58) Field of Classification Search
USPC ........................................................ 713/156
See application file for complete search history.

(56) References Cited

U.S. PATENT DOCUMENTS

| | | | | |
|---|---|---|---|---|
| 2010/0279647 | A1* | 11/2010 | Jacobs | H04W 4/008 455/404.1 |
| 2013/0205378 | A1* | 8/2013 | Oba | G06F 21/44 726/7 |
| 2013/0235760 | A1 | 9/2013 | Merlin et al. | |
| 2013/0235792 | A1* | 9/2013 | Abraham | H04W 88/04 370/315 |
| 2013/0295921 | A1 | 11/2013 | Bhargava et al. | |
| 2014/0119544 | A1* | 5/2014 | Lee | H04W 4/02 380/270 |
| 2014/0162700 | A1* | 6/2014 | Zhang | H04W 4/10 455/456.5 |
| 2015/0047048 | A1* | 2/2015 | Charugundla | H04L 65/60 726/26 |
| 2015/0326302 | A1* | 11/2015 | Stojanovski | H04B 7/155 370/315 |
| 2016/0269185 | A1* | 9/2016 | Stojanovski | H04L 9/3247 |
| 2016/0344726 | A1* | 11/2016 | Stojanovski | H04W 76/14 |
| 2017/0041768 | A1* | 2/2017 | Pattan | H04W 4/10 |

FOREIGN PATENT DOCUMENTS

| | | | |
|---|---|---|---|
| JP | 2010527211 | A | 8/2010 |
| JP | 2013520070 | A | 5/2013 |
| WO | 2014051126 | A1 | 4/2014 |

OTHER PUBLICATIONS

Groves, M., "Elliptic Curve-Based Certificateless Signatures for Identity-Based Encryption (ECCSI)", Internet Engineering Task Force (IETF), RFC 6507, Feb. 2012,17 pages.*

Mousavi-Nik, et al. Proposed SecureSIP Authentication Scheme based on Elliptic Curve cryptography, International Journal of Computer Applications, Nov. 2012, pp. 25-30, vol. 58—No. 8.*

International Search Report and Written Opinion received for International Patent Application No. PCT/US2015/037576, dated Sep. 30, 2015, 16 pages.

Groves, M. "Elliptic Curve-Based Certificateless Signatures for Identity-Based Encryption", memo, Feb. 2012, 17 pages, IETF Trust.

"Mission Critical Push to Talk MCPTT", Technical Specification, May 2014, 26 pages, Release 13, 3rd Generation Partnership Project, Valbonne, France.

"Technical Specification Group Services and System Aspects; Mission Critical Push to Talk (MCPTT) over LTE, Stage 1", 3GPP technical specification (TS) 22.179 V13.1.0 (Mar. 2015), 76 pages, (Author unknown).

"Technical Specification Group Services and System Aspects; 3G security; Access security for IP-based services", Release 12.3.0, 3GPP TS 33.203, (2013), 125 pages, (Author unknown).

Groves, M., "Elliptic Curve-Based Certificateless Signatures for Identity-Based Encryption (ECCSI)", Internet Engineering Task Force (IETF), RFC 6507, Feb. 2012, 17 pages.

Groves, M., "Sakai-Kasahara Key Encryption (SAKKE)", Internet Engineering Task Force (IETF), RFC 6508, Feb. 2012, 21 pages.

International Preliminary Report on Patentability, PCT/US2015/037576, dated Jan. 12, 2017, 12 pages.

Intel, "Discussion Paper Supporting Proposal for New SA2 WID on Mission Critical Push to Talk over LTE (MCPTT)" SA WG2 Meeting #102, U.S. Department of Commerce, MCPTT/Rel-13, St. Juliian's, Malta, Mar. 24-28, 2014, 4 pages.

Intel, "On MCPTT Interaction with ProSe an GCSE", SA WG2 Meeting #103, May 19-23, 2014, Phoenix, AZ, USA. 4 pages.

Japanese and English Translation of Japanese First Office Action for Patent Application No. 2016-572496, dated Dec. 19, 2017, 9 pages.

Muthaiah Venkatachalam, "Clarification on MCPTT operation modes", 3GPP TSG-SA, WG1Meeting #66, May 12-16, 2014, Intel, Sapporo, Japan, 4 pages.

Extended European Search Report for Patent Application No. 15815068, dated Jan. 25, 2018, 8 pages.

Zigbee Alliance: ZigBee Specification, ZigBee Document 053474r20, Sponsored by: ZigBeeAlliance Accepted by ZigBee Alliance Board of Directors, Retrieved from the Internet Jun. 8, 2017: URL:http://www.zigbee.org/wp-content/uploa ds/2014/11/docs-05-3474-20-0csg-zigbee-specification.pdf622 pages.

Korean and English Translation of Korean Office Action for Patent Application No. 10-2016-7033675, dated Jan. 9, 2018, 11 pages.

Samaneh Sadet, et al, "Proposed SecureSIP Authentication Scheme based on Elliptic Curve Cryptography" International Journal of Computer Applications (0975-8887) vol. 58—No. 8, Nov. 2012, 6 pages.

* cited by examiner

Storage Medium 700

*Computer Executable Instructions for 600*

```
DISCOVER, AT A FIRST UE, A SECOND UE CAPABLE OF SERVING AS A
RELAY UE TO OR FROM A NETWORK ARRANGED TO PROVIDE CRITICAL
COMMUNICATION SERVICES
902
          |
ESTABLISH A DIRECT LINK WITH A SECOND UE RESPONSIVE TO MUTUAL
AUTHENTICATION WITH THE SECOND UE
904
          |
REGISTER FOR THE CRITICAL COMMUNICATION SERVICES RESPONSIVE
TO A SECURITY ASSOCIATION WITH THE NETWORK
906
          |
RECEIVE ENCRYPTED CRITICAL COMMUNICATION CONTENT
ORIGINATING FROM THE NETWORK OVER THE DIRECT LINK VIA USE OF
UNICAST OR MULTICAST DELIVERY MODES
908
```

*FIG. 9*

Storage Medium 1000

*Computer Executable Instructions for 900*

RECEIVE, AT A SERVER FOR A NETWORK PROVIDING CRITICAL COMMUNICATION SERVICES, A FIRST REGISTRATION REQUEST TO REGISTER A FIRST UE FOR THE CRITICAL COMMUNICATION SERVICES
1202

ESTABLISH A FIRST SECURITY ASSOCIATION WITH THE FIRST UE RESPONSIVE TO THE FIRST REGISTRATION REQUEST
1204

RECEIVE A SECOND REGISTRATION REQUEST FROM A SECOND UE TO REGISTER THE SECOND UE FOR CRITICAL COMMUNICATION SERVICES, THE SECOND REGISTRATION REQUEST RELAYED THROUGH THE FIRST UE THAT IS CAPABLE OF ACTING AS A TNA NODE BETWEEN THE NETWORK AND THE SECOND UE
1206

ESTABLISH A SECOND SECURITY ASSOCIATION THE SECOND UE RESPONSIVE TO THE SECOND REGISTRATION REQUEST
1208

SENDING ENCRYPTED CRITICAL COMMUNICATION CONTENT DESTINED FOR THE SECOND UE VIA USE OF UNICAST OR MULTICAST DELIVERY MODES TO THE FIRST UE
1210

FIG. 12

Storage Medium 1300

*Computer Executable Instructions for 1200*

*FIG. 13*

TECHNIQUES FOR SECURELY RECEIVING CRITICAL COMMUNICATION CONTENT ASSOCIATED WITH A CRITICAL COMMUNICATION SERVICE

RELATED CASE

This application claims priority to U.S. Provisional Patent Application No. 62/019,309 filed on Jun. 30, 2014, that is hereby incorporated by reference in its entirety.

TECHNICAL FIELD

Examples described herein are generally related to wireless communication devices.

BACKGROUND

A communication service such as a Push to Talk (PTT) service provides ways by which two or more users may engage in communication. Users may request permission to transmit a communication (e.g., traditionally by pressing a button). An evolving type of critical communication service is referred to as Mission Critical Push To Talk over LTE (MCPTT). MCPTT supports an enhanced PTT service that is suitable for mission critical scenarios and is based upon 3GPP Evolved Packet System (EPS) services. MCPTT primarily targets providing a critical communication service for such organizations associated with public safety, transportation, utilities, industrial or nuclear plant operations.

BRIEF DESCRIPTION OF THE DRAWINGS

FIG. 7 illustrates an example of a first storage medium.
FIG. 9 illustrates an example of a second logic flow.
FIG. 10 illustrates an example of a second storage medium.
FIG. 12 illustrates an example of a third logic flow.
FIG. 13 illustrates an example of a third storage medium.

DETAILED DESCRIPTION

Figure 1:
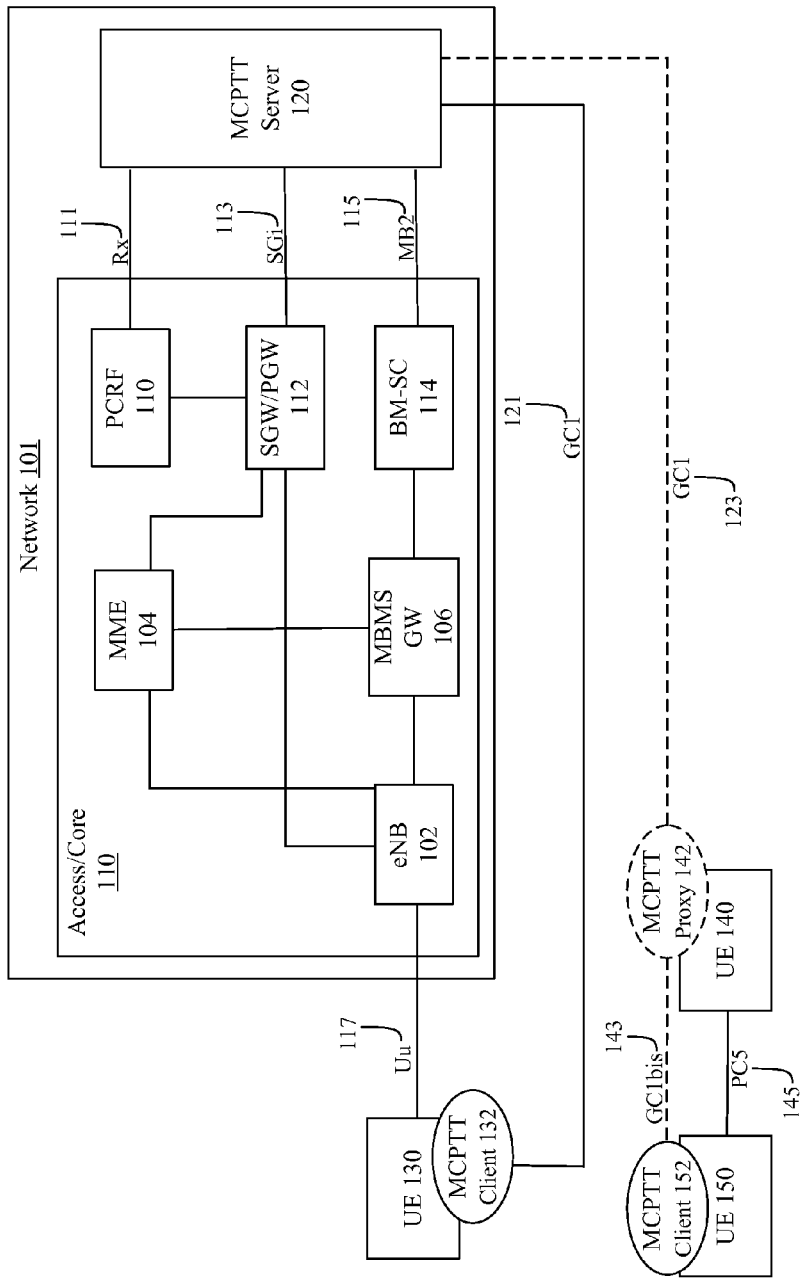
FIG. 1 illustrates an example of a system.

Examples are generally directed to improvements for securely receiving critical communication content associated with a critical communication service (e.g., MCPTT) that may involve use of wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

As contemplated in the present disclosure, MCPTT supports an enhanced PTT service, suitable for mission critical scenarios and is based upon 3GPP EPS services. MCPTT is typically a session initiation protocol (SIP) based service that may be provided via a centralized MCPTT server residing in a network (e.g., a 3GPP EPS network). The MCPTT server may be an IP Multimedia Subsystem (IMS) application server, but the MCPTT server may also be a non-IMS based SIP server. User equipment (UEs) may directly attach to the network to receive critical communication services from an MCPTT server. Some UEs may also utilize Proximity Services (ProSe) capabilities to indirectly attach to the network through a relay UE. UEs utilizing ProSe capabilities may be outside of a coverage area of the network and may be referred to as remote UEs.

In some examples, remote UEs may utilize a relay UE's direct attachment to the network to receive critical communication services from the MCPTT server. The relay UE may be on the signaling path of all SIP messages that may include critical communication content destined for the remote UE. In some examples, the remote UE may desire that the relay UE is not able to eavesdrop on these SIP messages including critical communication content. A solution is needed to allow the remote UE to agree to common key material with the MCPTT server that can be used to securely relay a master session key. The master session key may be for use by only the remote UE to decrypt encrypted critical communication content sent from the MCPTT server and routed through the relay UE. It is with respect to these and other challenges that the examples described herein are needed.

In some first examples, methods are implemented for securely relaying critical communication content associated with a critical communication service. These methods may include registering, at a first UE capable of operating in compliance with one or more 3GPP LTE standards including LTE-A, for critical communication services responsive to a security association with a network arranged to provide the critical communication services. The methods may also include establishing a direct link with a second UE responsive to mutual authentication with the second UE. The methods may also include acting as a trusted node authentication (TNA) node between the network and the second UE to serve as a relay UE for the second UE. The methods may also include receiving a first message including critical communication content via use of unicast or multicast delivery modes. The methods may also include sending the critical communication content in a second message over the direct link, the second message to be sent via use of unicast or multicast delivery modes.

According to some second examples, methods are implemented for securely relaying critical communication content associated with a critical communication service. These methods may include discovering, at a first UE capable of operating in compliance with one or 3GPP LTE standards including LTE-A, a second UE capable of serving as a relay UE to or from a network arranged to provide critical communication services. The methods may also include establishing a direct link with a second UE responsive to mutual authentication with the second UE. The methods may also include registering for the critical communication services responsive to a security association with the network and receiving encrypted critical communication content originating from the network over the direct link via use of unicast or multicast delivery modes.

In some third examples, methods are implemented for securely sending critical communication content associated with a critical communication service. These methods may include receiving, at a server for a network providing critical communication services, a first registration request to register a first UE for the critical communication services. The methods may also include establishing a first security association with the first UE responsive to the first registration request. The methods may also include receiving a second registration request from a second UE to register the second UE for the critical communication services. The second registration request may be relayed through the first UE that is capable of acting as a TNA node between the network and the second UE. The methods may also include establishing a second security association with the second UE responsive to the second registration request. The methods may also include sending encrypted critical communication content destined for the second UE via use of unicast or multicast delivery modes to the first UE.

FIG. 1 illustrates an example system 100. In some examples, elements of system 100 may be arranged for providing critical communication services to one or more UEs. These critical communication services may include mission critical push to talk (MCPTT) services as specified in a 3GPP technical specification (TS) 22.179, entitled "Technical Specification Group Services and System Aspects; Mission Critical Push to Talk (MCPTT) over LTE, Stage 1", Release 13, V13.0.1, published in January of 2015, and/or previous or subsequent releases or versions (hereinafter referred to as 3GPP TS 22.179). For example, as shown in FIG. 1, a network 101 may include an MCPTT server 120 that may serve as centralized server to enable network 101 to provide a SIP-based critical communication service to UEs 130, 140 or 150. MCPTT server 120 may be arranged as an IMS application server or may be arranged as a non-IMS based SIP server.

In some examples, access/core 110 may include elements of network 101 typically associated with 3GPP E-UTRAN access and 3GPP E-UTRAN core elements. For example, a UE such as UE 130 may gain access to network 101 via an LTE-Uu interface (not shown) through Uu 117 coupled to evolved Node B (eNB) 102. Also, as shown in FIG. 1, MCPTT server 120 may couple to various access/core 110 elements. For example, MCPTT server 120 may couple to a policy and charging rules function (PCRF) 110 via Rx 111 that may represent an Rx interface reference point. MCPTT server 120 may also couple to a serving gateway/packet data gateway (SGW/PWG) 112 via SGi 113 that may represent an SGi interface reference point. MCPTT server 120 may also couple to a broadcast/multicast—service center (BM-SC) 1114 via MB2 115 that may represent an MB2 reference point. Mobile management entity (MME) 104 and multimedia broadcast/multicast service gateway (MBMS GW) 106 may provide core 3GPP E-UTRAN services to MCPTT server 120 and/or UEs 130, 140 and 150 to facilitate the providing of critical communication services by network 101.

According to some examples, as shown in FIG. 1, UE 130 may attach directly to MCPTT server 120. For these examples, UE 130 may include an MCPTT client 132 that may be arranged as a SIP-based MCPTT client for communication with MCPTT server 120. Also, MCPTT server 120 may be arranged as a type of group communication service application server (GCS AS) and GC1 121 may represent a GC1 reference point through which MCPTT server 120 couples with MCPTT client 132 at UE 130.

In some examples, UEs such as UE 140 may also attach to MCPTT server 120 of network 101 through an application layer gateway (ALG) relay. An ALG relay may also be referred to as an MCPTT proxy. As shown in FIG. 1, UE 140 includes an MCPTT proxy 142 and GC1 123 may represent a GC1 reference point through which MCPTT server 120 couples with MCPTT proxy 142. Also, as mentioned above, MCPTT server 120 may provide a SIP-based critical communication service, which may mean the MCPTT proxy 142 may be a SIP proxy acting as a back-to-back user agent (B2BUA) for other UEs and thus may serve as a UE-to-network relay for out of network coverage UEs.

According to some examples, UEs out of network coverage of network 101 may still be able to obtain critical communication service by coupling through UEs serving as UE-to-network relays such as UE 140. For example, UE 150 having an MCPTT client 152 may be able to indirectly couple to MCPTT server 120 through MCPTT proxy 142 and GC1-bis 143 may represent a signaling path for GC1-bis signaling between MCPTT client 152 and MCPTT proxy 142.

In some examples, UE 140 acting as an UE-to-network relay may need to be able to relay traffic from MCPTT server 120 only for authorized UEs and/or authorized groups of UEs (e.g., belonging to an MCPTT group). Also, UE 140 may need to be able to act as an UE-to-network relay for groups of which it is not a member. As described more below, a relay UE such as UE 140 may include logic and/or features to enable the relay UE to act as a trusted node authentication (TNA) node between an MCPTT server and a remote UE such as UE 150. UE 140 acting as a TNA node may be arranged in accordance with 3GPP TS 33.203, entitled "Technical Specification Group Services and System Aspects; 3G security; Access security for IP-based services", Release 12, V12.8.0, published in December of 2014, and/or previous or subsequent releases or versions (hereinafter referred to as 3GPP TS 33.203). Acting as a TNA node may allow the relay UE to securely relay information between the MCPTT server and the remote UE. The remote UE may then be enable to establish a security association with the MCPTT server responsive to the remote UE registering for critical communication services. Acting as a TNA node may further allow the relay UE to securely relay critical communication content from the MCPTT server associated with the registered critical communication services.

According to some examples, critical communication content may be delivered to directly coupled UEs such as UEs 130 or 140 in either a unicast mode (e.g., via EPS bearers) or in multicast mode (e.g., via evolved MBMS (eMBMS) bearers). Use of eMBMS bearers may be justified in cases where a sufficient number of UEs are physically located within a same coverage area or cell. When the number of UEs in a cell is low, unicast delivery via EPS may be more efficient compared to eMBMS or multicast delivery. In some examples, MCPTT server 120 may include logic and/or features capable of monitoring the number of UEs in a cell and then adjust a delivery mode accordingly.

In some examples, as part of ProSe capabilities, UE 140 and UE 150 may be able to establish a direct link that is shown in FIG. 1 as PC5 145. PC5 145 may represent the direct link through a PC5 interface (not shown) associated with the ProSe capabilities. Establishment of the direct link may include relay discovery, mutual authentication and IP address assignment. Establishment of the direct link may also include UE 140 and UE 150 setting up a wireless local area network (WLAN) direct connection. The WLAN direct connection may be arranged to operate according to Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11"). According to some examples, following the same logic as mentioned above for MCPTT server 120 selecting a unicast or multicast delivery mode, logic and/or features of a relay UE such as UE 140 may choose a unicast or multicast delivery mode to relay information (e.g., critical communication content) to one or more remote UEs such as UE 150 via a PC5 interface.

Although not shown in FIG. 1, a direct link between UEs 140 and 150 and may also be establish via an LTE-Uu interface. Since UE 140 includes the ALG relay serving as MCPTT proxy 142 it may be possible to selectively choose whether to use the PC5 or the LTE-Uu interface to relay information to UE 140. Thus, it may be possible to use unicast delivery via the LTE-Uu interface and multicast delivery via the PC5 interface, or vice versa.

As described more below, various security measures may be implemented to enable a relay UE such as UE 140 to relay critical communication content to a remote UE such as UE 150 without the relay UE being able to eavesdrop on that critical communication content. This is important since MCPTT proxy 142 may be a SIP B2BUA and is thus on a signaling path of all SIP messages exchanged between MCPTT server 120 and UE 140. Not being able to eavesdrop may be needed when UE 140 is not a member of the MCPTT group that is registered to receive the critical communication content. This may be regardless of whether the delivery mode is unicast or multicast. The various security measures may include a way to allow a remote UE such as UE 140 to agree to common key material with an MCPTT server such as MCPTT server 120 that can be subsequently used to deliver a master session key (MSK) such as an MBMS MSK. The MSK may then be used to encrypt and then decrypt critical communication content destined for the remote UE.

In some examples, the security measures used to agree to common key material may include use of identity-based cryptography mechanisms, schemes or algorithms. Identity-based cryptography schemes may be based on industry standards including Request for Comments (RFC) 6507, "Elliptic Curve-Based Certificateless Signatures for Identity-Based Encryption (ECCSI)", published in February 2012 by the Internet Engineering Task Force (IETF), and hereinafter referred to as the ECCSI signature scheme. Identity-based cryptography algorithms may be based on industry standards including RFC 6508, "Sakai-Kasahara Key Encryption (SAKKE)", published in February 2012 by the IETF, hereinafter referred to as the SAKKE algorithm.

Figure 2:
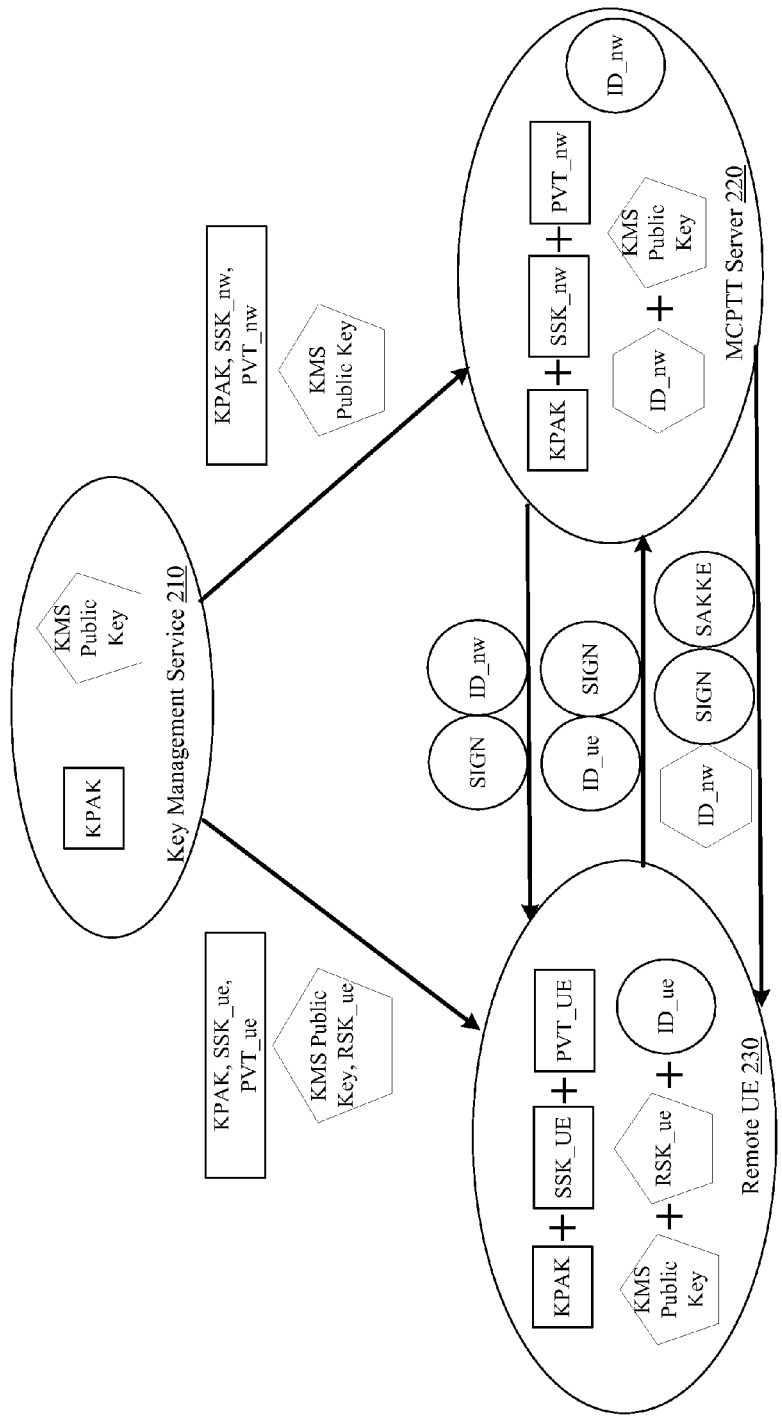
FIG. 2 illustrates an example scheme.

FIG. 2 illustrates an example scheme 200. In some examples, as shown in FIG. 2, scheme 200 includes interactions between a key management service 210, an MCPTT server 220 and a remote UE 230 to establish a security association that includes mutual authentication and an agreement of common key material between MCPTT sever 220 and remote UE 230. MCPTT server 220 may represent a server of a network (e.g., network 101) capable of providing critical communication services. For these examples, scheme 200 may be a way in which both mutual authentication between remote UE 230 and MCPTT server 220 may be obtain and remote UE 230 may agree to common key material with MCPTT server 220. As described more below, the common key material may be subsequently used to deliver an MSK such as an MBMS MSK for use to encrypt and then decrypt critical communication content associated with the critical communication services provided by the network.

According to some examples, square or rectangle shapes shown in FIG. 2 may represent elements of an ECCSI signature scheme and pentagon shapes may represent elements of implementing a SAKKE algorithm. Also, circular and octagon shapes may represent elements shared between MCPTT server 220 and remote UE 230 as part of identity-based cryptography scheme based on using either the ECCSI signature scheme or the SAKKE algorithm.

In some examples, the ECCSI signature scheme may be implemented as part of mutual authentication between MCPTT server 220 and UE 230. For implementing the ECCSI signature scheme, MCPTT server 220 and remote UE 230 may have a common root of trust that is shown in FIG. 2 as key management service 210. For these examples, key management service 210 may have a key management service (KMS) public authentication key (KPAK) that is known to both UE 230 and MCPTT server 220. Additionally, both UE 230 and MCPTT server 220 may have a publicly known identity. For example, public known identities for remote UE 230 and MCPTT server 220 are represented in FIG. 2 as ID_ue and ID_nw, respectively.

Further, for implementing the ECCSI signature scheme portion of scheme 200, both MCPTT server 220 and remote UE 230 may be able to serve the role as a signer and a verifier to allow for mutual authentication. As signers, both MCPTT server 220 and UE 230 need to apply to key management service 210 for a secret signing key (SSK) and a public validation token (PVT). So as shown in FIG. 2, in addition to receiving KPAK, MCPTT server 220 may apply for and receive SSK_nw and PVT_nw from key management service 210. Similarly, UE 230 may apply for and receive SSK_ue and PVT_ue from key management service 210. MCPTT server 220, while acting as a signer, may use KPAK, SSK_nw and PVT_nw to produce a digital signature (SIGN) according to the ECCSI signature scheme. Similarly, UE 230 while also acting as a signer may use KPAK, SSK_ue and PVT_nw to produce SIGN. The separate SIGNs produced by MCPTT server 220 and UE 230 may be decoded or decrypted by respective verifiers using KPAK and the signer's public identity (ID_ue or ID_nw) to perform a verification algorithm according to the ECCSI signature scheme in order to complete mutual authentication.

According to some examples, the SAKKE algorithm may be used to arrive at an agreement of common key material between MCPTT server 220 and UE 230. For these examples, key management service 210 may again act as a common root of trust. Key management service 210 has a KMS public key that is provided to both remote UE 230 and MCPTT server 220. Remote UE 230 may also apply for and receive a receiver secret key (RSK) shown in FIG. 2 as RSK_ue from key management service 210. Also, it may be assumed that a same publically known identity (ID_ue) as mentioned above for the ECCSI signature scheme may also apply for use with the SAKKE algorithm (although other publically known IDs may be used). However, a new or different publically known ID for MCPTT server 220 may be used as demonstrated in FIG. 2 as ID_nw in the octagon shape.

Further, for the SAKKE algorithm part of scheme 200, it may be assumed that as far as an agreement of common key material, the common key or secret key may always be generated by MCPTT 230. Thus, remote UE 230 as shown in FIG. 2 is the only receiver of a SAKKE encrypted payload. In some examples, MCPTT server 220 may use the KMS public key and its ID_nw to encode the common key material (the common key material may also be referred to as a shared secret value (SSV)) to generate a SAKKE payload. Upon receipt of the SAKKE payload, remote UE 230 may use the KMS public key, RSK_ue and ID_ue to decrypt the SAKKE encrypted payload according to a decryption algorithm described in RFC 6508 in order to obtain the common key material or SSV.

In some examples, although a relay UE is not shown in FIG. 2, a relay UE similar to UE 140 shown in FIG. 1 may be on a same SIP signaling path that runs between remote UE 230 and MCPTT server 220. For these examples, the relay UE is unable to decrypt the agreed common key material or SSV that is conveyed from MCPTT server 220 in the SAKKE encrypted payload.

Figure 3:
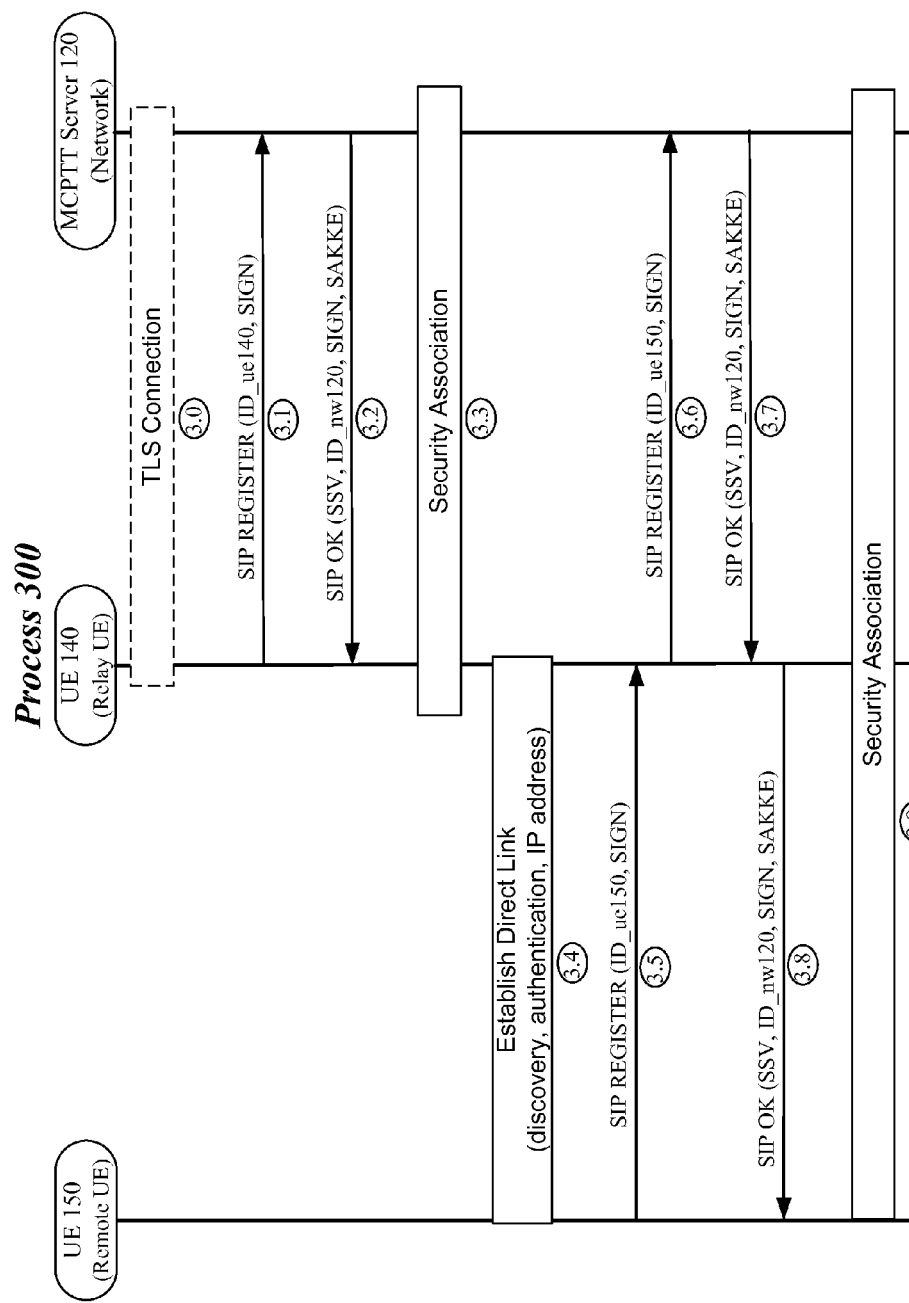
FIG. 3 illustrates an example first process.

FIG. 3 illustrates a first example process. In some examples, as shown in FIG. 3, the first example process includes process 300. Process 300 may be for establishing security associations between a relay UE and a network including an MCPTT server and between a remote UE and the network. For these examples, elements of system 100 as shown in FIG. 1 such as UEs 140 and 150 or MCPTT server 120 may be related to process 300. Scheme 200 shown in FIG. 2 may also be related to process 300. However, the example process 300 is not limited to implementations using elements of system 100 or scheme 200 shown in FIGS. 1-2.

Beginning at process 3.0 (TLS Connection), logic and/or features at MCPTT server 120 and UE 140 may be capable of establishing a transport layer security (TSL) connection for SIP signaling. For example, the TLS connection may be established between MCPTT server 120 and MCPTT proxy 142 over GC1 123. The TLS connection may be established according to 3GPP TS 33.203, Annex 0.

Moving to process 3.1 (SIP REGISTER (ID_ue140, SIGN), logic and/or features at UE 140 may send a SIP REGISTER message to MCPTT server 120 that includes a publically known ID for UE 140. In some examples, the SIP REGISTER message is signed using the publically known ID for UE 140 (ID_ue140) and this may be part of a mutual authentication between UE 140 and MCPTT server 120.

Moving to process 3.2 (SIP OK (SSV, ID_nw120, SIGN, SAKKE), logic and/or features at MCPTT 120 may send a SIP OK message (e.g., a SIP 200 OK message). The SIP OK message may be signed using MCPTT 120's publically known ID (ID_nw120). In some examples, MCPTT 120 may generate an SSV or common key material and forward it as an encrypted SAKKE payload.

Moving to process 3.3 (Security association), logic and/or feature at UE 140 may be able to decrypted the encrypted SAKKE payload using UE 140's publically known ID as well as a KMS public key and RSK received from a key management service. In some examples, the decrypted SAKKE payload may enable UE 140 to obtain the SSV or common key material in order to establish a security association. The security association may be established over GC1 123. Also, at this time, UE 140 may not know that it will be solicited to act as an UE-to-network relay UE.

Moving to process 3.4 (Establish Direct Link), logic and/or features at UE 140 and UE 150 may be capable of establishing a direct link. In some examples, UE 140 and UE 150 may perform ProSe UE-network-relay discovery and establishing a secure point-to-point link (e.g., through a PC5 interface or an LTE-Uu interface). As part of this process, logic and/or features at UE 150 may be mutually authenticated with UE 140 and may be assigned an IP address/prefix by UE 140. Mutual authentication, for example, may include implementation of the ECCSI signature scheme.

Moving to process 3.5 (SIP REGISTER (ID_ue150, SIGN)), logic and/or features at UE 150 may initiate registration for a critical communication service such as MCPTT via an MCPTT proxy 142 residing in UE 140 by first sending a SIP REGISTER message to UE 150 via GC1bis 143. In some examples, the SIP REGISTER message may include signer information as described above for the ECCSI signature scheme portion of scheme 200 to enable MCPTT server 120 to verify UE 140's authenticity for receiving the critical communication services.

Moving to process 3.6 (SIP REGISTER (ID_ue150, SIGN)), logic and/or features at MCPTT server 120 may receive the SIP REGISTER message forwarded from UE 140. In some examples, from this point on in the process, UE 140 starts acting as a TNA node and may initially block all traffic other than SIP signaling stemming or originating from UE 150. Also, all SIP signaling messages flowing from/to UE 150 may be routed over GC1 123 using UE 140's security association established with MCPTT server 120.

Moving to process 3.7 (SIP OK (SSV, ID_nw120, SIGN, SAKKE)), logic and/or features at MCPTT server 120 may send a SIP OK message (e.g., a SIP 200 OK message) destined for UE 150. The SIP OK message may be signed using MCPTT 120's publically known ID (ID_nw120). In some examples, MCPTT 120 may generate a second SSV or second common key material and forward it as an encrypted SAKKE payload. In some examples, the SIP OK message may include similar information as described above for the SAKKE algorithm portion of scheme 200.

Moving to process 3.8 (SIP OK (SSV, ID_nw120, SIGN, SAKKE), logic and/or features at UE 140 may relay or forward the SIP OK message to UE 150 via GC1bis 143.

Moving to process 3.9 (Security association), logic and/or feature at UE 140 may be able to decrypted the encrypted SAKKE payload included in the SIP OK message using UE 150's publically known ID as well as a KMS public key and RSK received from a key management service. In some examples, the decrypted SAKKE payload may enable UE 150 to obtain the second SSV or second common key material in order to establish a security association. The second SSV or second common key material may then enable UE 150 and MCPTT 120 to conduct subsequent communications without UE 140 being able to eavesdrop on those communications. Process 300 may then come to an end.

Figure 4:
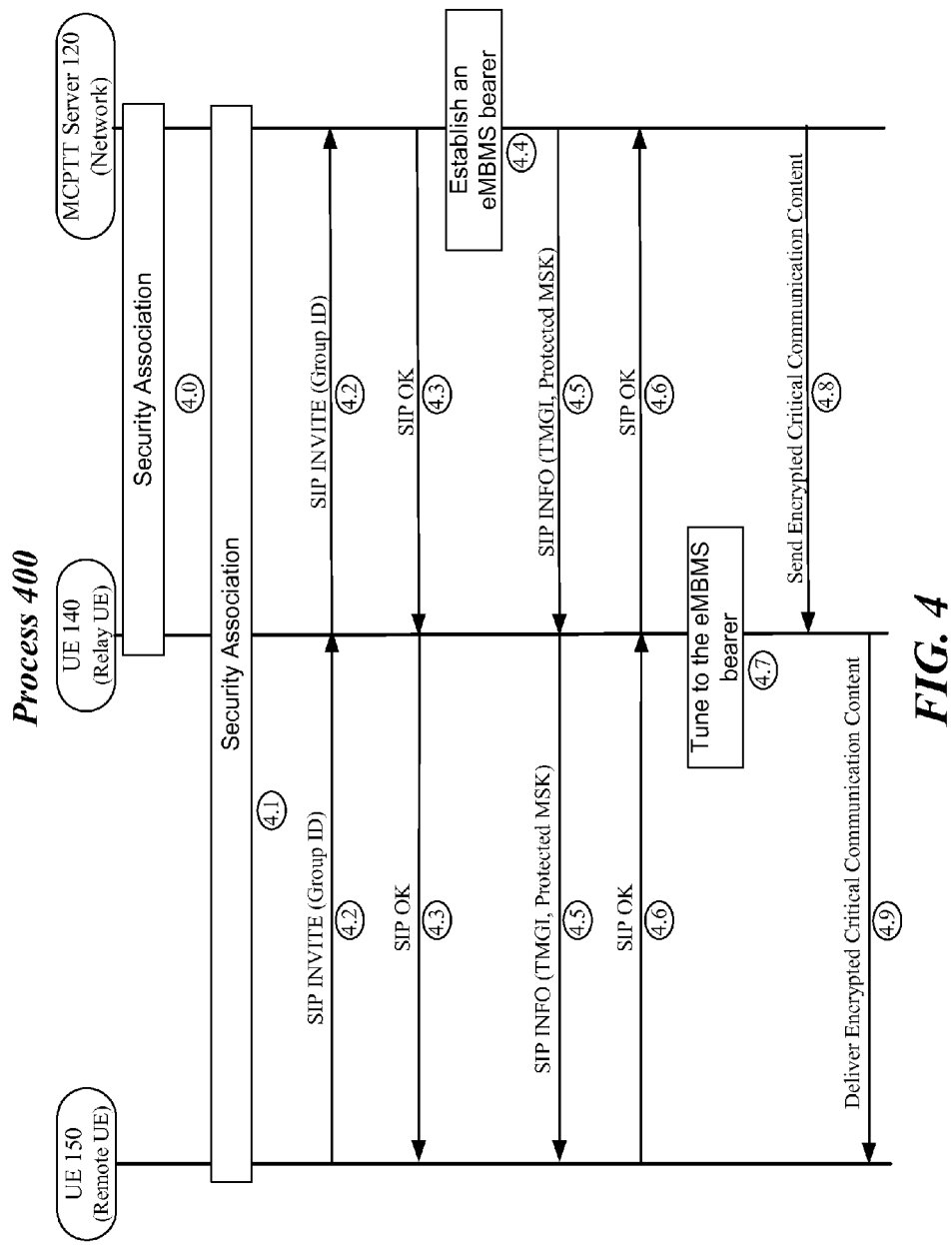
FIG. 4 illustrates an example second process

FIG. 4 illustrates a second example process. In some examples, as shown in FIG. 4, the second example process includes process 400. Process 400 may be for securely receiving critical communication content (e.g., MCPTT content) following establishment of separate security associations by a remote UE and a relay UE with a network capable of providing critical communication services. For these examples, elements of system 100 as shown in FIG. 1 such as UEs 140 and 150 or MCPTT server 120 may be related to process 400. Scheme 200 shown in FIG. 2 may also be related to process 400. However, the example process 400 is not limited to implementations using elements of system 100 or scheme 200 shown in FIGS. 1-2.

Beginning at process 4.0 (Security association), a first security association may be established between MCPTT server 120 and UE 140 as mentioned above for process 300. In some examples, the first security association may be established over GC1 123.

Moving to process 4.1 (Security association), a second security association may be established between MCPTT sever 120 and UE 150 as mentioned above for process 300. According to some examples, the second security association may be established over a combination of GC1 123 and GC1bis 147 with UE 140 acting as a TNA node.

Moving to process 4.2 (SIP INVITE (Group ID), logic and/or features at UE 150 may generate and send an SIP INVITE message towards MCPTT server 120 that includes a Group ID. In some examples, UE 150 may wish to joint an MCPTT group that may be defined with an application-layer identifier Group ID (typically a SIP URI).

Moving to process 4.3 (SIP OK), logic and/or features at MCPTT server 120 may generate and send a SIP OK or 200 OK response message towards UE 150 that is routed through UE 140.

Moving to process 4.4 (Establish an eMBMS bearer), logic and/or features at MCPTT server 120 may request establishment an eMBMS bearer based on a number of UEs in a cell or within a coverage area of network 101. In some examples, a temporary mobile group identity (TMGI) may be used to identify an MBMS session associated with the request to establish the eMBMS bearer for the UE in the cell or coverage area of network 101. Once established, the eMBMS bearer may be used to send encrypted critical communication content.

Moving to process 4.5 (SIP INFO (TMGI, Protected MSK)), logic and/or features at MCPTT server 120 may generate and send a SIP INFO message that include the TMGI and a protected master session key (MSK). In some examples the protected MSK may be an MBMS MSK that is protected by being encrypted using common key material or SSV shared with UE 150 when establishing the second security association. For these examples, UE 140 does not have the common key material or SSV and thus is unable to decrypt the protected MSK.

Moving to process 4.6 (SIP OK), logic and/or features at UE 150 may respond with a SIP OK or 200 OK response message that is relayed by UE 140 to MCPTT server 120.

Moving to process 4.7 (Tune to the eMBMS bearer), logic and/or features at UE 140 may tune to the eMBMS bearer established by MCPTT server 120 to relay encrypted critical communication content through UE 140.

Moving to process 4.8 (Send Encrypted Critical Communication Content), logic and/or features at MCPTT server 120 may encrypt critical communication content (e.g., MCPTT content) using the MSK (e.g., an MBMS MSK) and send the encrypted critical communication content towards UE 150.

Moving to process 4.9 (Deliver Encrypted Critical Communication Content), logic and/or features of UE 140 may deliver encrypted critical communication content to UE 150. UE 150 may then use the MSK received at process 4.5 to decrypt the encrypted critical communication content. In some examples, if UE 140 decides to use a multicast delivery mode over PC5 145, it may dynamically assign a Layer-2 identifier to be used for multicast delivery through a PC5 interface. The Layer-2 identifier may be the ProSe Layer-2 Group ID parameter described in 3GPP TS 23.303 publication entitled "Technical Specification Group Services and System Aspects; Proximity-based services (ProSe); State 2, Release 12, V12.3.0, published December 2014 and/or previous or subsequent releases or versions (hereinafter referred to as 3GPP TS 23.303). For these examples, all UEs to include UE 150 that depend on UE 140 for relaying information from MCPTT server 120 and listening to the same MCPTT group may be associated with a same ProSe Layer-2 Group ID. UE 150 may also know that encrypted critical communication content associated with the MCPTT group identified with the ProSe Layer-2 Group ID may be delivered through the PC5 interface using either unicast mode or multicast mode. Process 400 may then come to an end.

Figure 5:
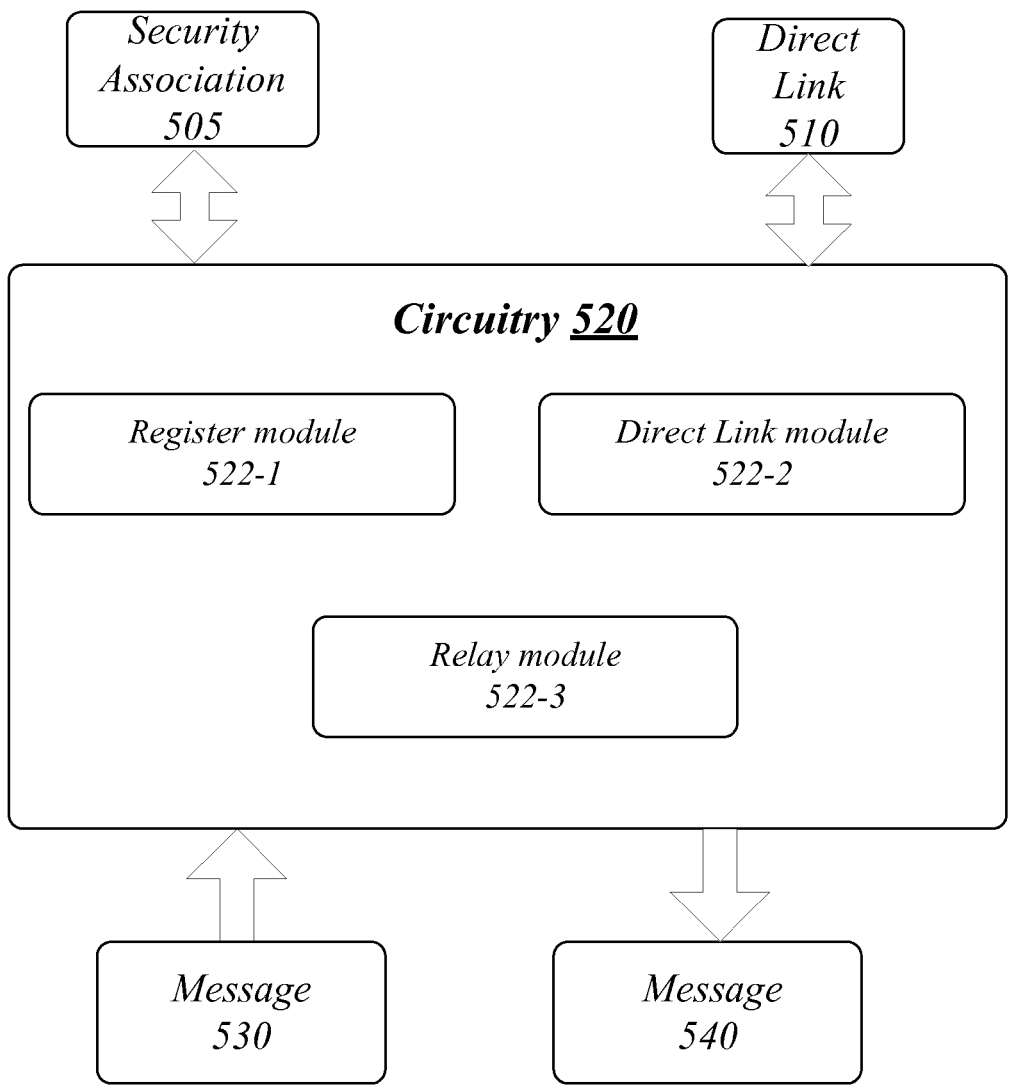
FIG. 5 illustrates an example block diagram for a first apparatus.

FIG. 5 illustrates a block diagram for an example first apparatus. As shown in FIG. 5, the example first apparatus includes apparatus 500. Although apparatus 500 shown in FIG. 5 has a limited number of elements in a certain topology, it may be appreciated that the apparatus 500 may include more or less elements in alternate topologies as desired for a given implementation.

The apparatus 500 may comprise an apparatus 500 having a circuitry 520 that may represent a portion of logic in hardware that may be generally arranged to execute one or more other portions of logic that may include modules 522-*a*. It is worthy to note that "a" and "b" and "c" and similar designators as used herein are intended to be variables representing any positive integer. Thus, for example, if an implementation sets a value for a=3, then a complete set of modules 522-*a* included in the one or more other portions of logic may include modules 522-1, 522-2 or 522-3. The examples are not limited in this context.

According to some examples, apparatus 500 may be implemented in an UE (e.g., UE 140) capable of operating in compliance with one or more 3GPP LTE Specifications including LTE-A. The examples are not limited in this context.

In some examples, as shown in FIG. 5, apparatus 500 includes circuitry 520. Circuitry 520 can be any of various commercially available processors, including without limitation an AMD® Athlon®, Duron® and Opteron® processors; ARM® application, embedded and secure processors; Qualcomm® Snapdragon, IBM®, Motorola® DragonBall®, Nvidia®Tegra® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processor. Dual microprocessors, multi-core processors, and other multi-processor architectures may also be employed as circuitry 520. According to some examples, circuitry 520 may also be an application specific integrated circuit (ASIC) and at least some modules 522-*a* may be implemented as hardware elements of the ASIC.

According to some examples, the logic of apparatus 500 may include a register module 522-1. Register module 522-1 may be executed by circuitry 520 to register a first UE. Register module 522-1 may register the first UE for critical communication services responsive to a security association with a network arranged to provide the critical communication services. In some examples, security association 505 may represent mutual authentication (e.g., using ECCSI signature scheme) and an agreement of common key material between register module 522-1 and the network (e.g., using SAKKE algorithm). The critical communication services may include mission critical communication services and the network may include an MCPTT server (e.g., MCPTT server 120) arranged to provide the mission critical communication services.

In some examples, the logic of apparatus 500 may also include a direct link module 522-2. Direct link module 522-2 may be executed by circuitry 520 to establish a direct link with a second UE responsive to mutual authentication with the second UE. For these examples, the second UE may be a remote UE (e.g., UE 150) outside of a coverage area of the network. Direct link 510 may represent the mutual authentication between the first and second UEs that may include implementation of the ECCSI signature scheme.

In some examples, the logic of apparatus 500 may also include a relay module 522-3. Relay module 522-3 may be executed by circuitry 520 to act as a TNA node between the network and the second UE to serve as a relay UE for the second UE to the network. Relay module 522-3 may be arranged to receive a first message (e.g., message 530) that includes encrypted critical communication content sent from the network via use of unicast or multicast delivery mode. Relay module 522-3 may also be arranged to send the encrypted critical communication content in a second message (e.g., message 540) over the direct link with the second UE, the second message to be sent from the first UE via use of unicast or multicast delivery modes. In some examples, if a multicast delivery mode is selected, relay module 522-3 may generate a multicast link-layer identifier specific to the encrypted communication content to be sent on the direct link with the second UE and then send the multicast link-layer identifier to the second UE in the second message.

Various modules of apparatus 500 and a device implementing apparatus 500 may be communicatively coupled to each other by various types of communications media to coordinate operations. The coordination may involve the uni-directional or bi-directional exchange of information. For instance, the modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
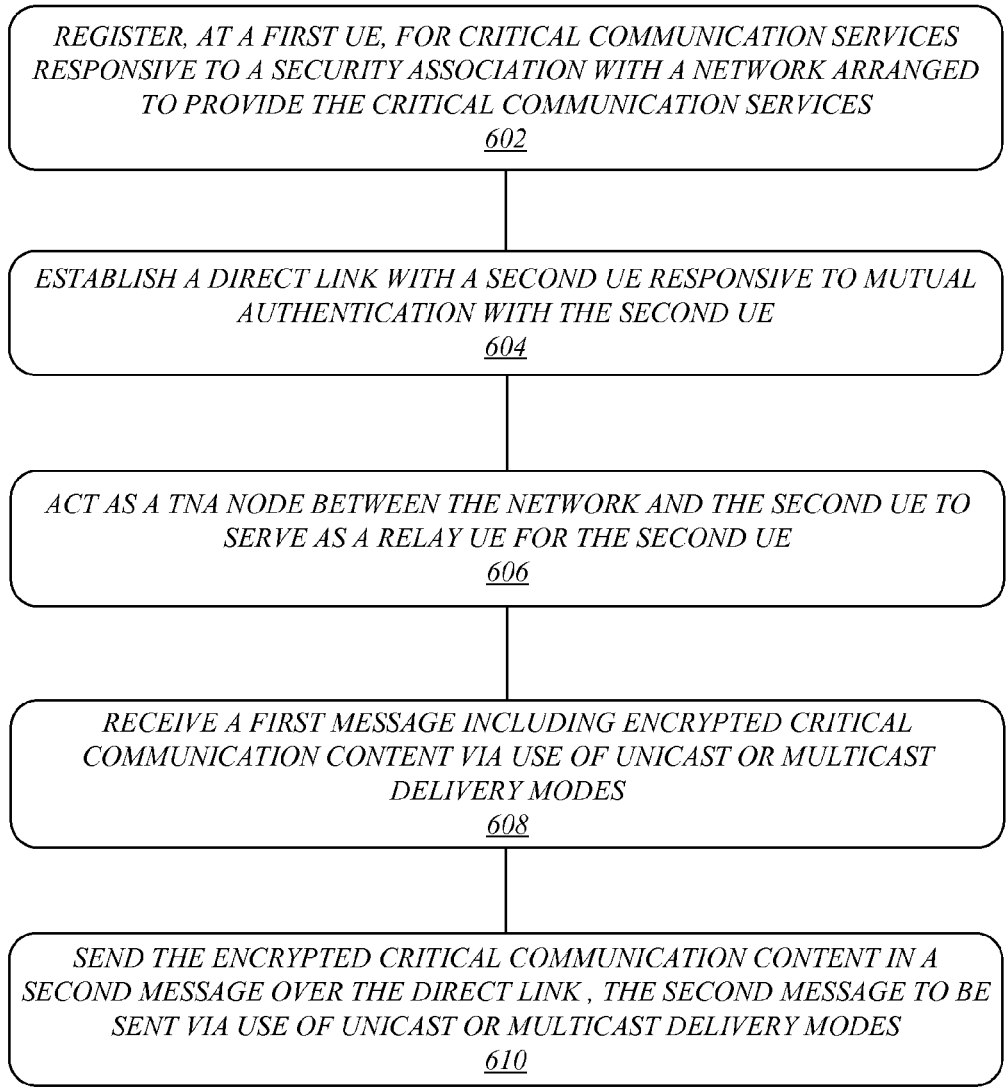
FIG. 6 illustrates an example of a first logic flow.

FIG. 6 illustrates an example of a first logic flow. As shown in FIG. 6, the first logic flow includes logic flow 600. Logic flow 600 may be representative of some or all of the operations executed by one or more logic, features, or devices described herein, such as apparatus 600. More particularly, logic flow 600 may be implemented by register module 522-1, direct link module 522-2 or relay module 522-3.

In the illustrated example shown in FIG. 6, logic flow 600 at block 602 may register, at a first UE, for critical communication services responsive to a security association with a network arranged to provide the critical communication services. In some examples, register module 522-1 may register for the critical communications services responsive to the security association.

According to some examples, logic flow 600 at block 604 may establish a direct link with a second UE responsive to mutual authentication with the second UE. For these examples, direct link module 522-2 may establish the direct link.

In some examples, logic flow 600 at block 606 may act as a TNA node between the network and the second UE to serve as a relay UE for the second UE. For these examples, relay module 522-3 may be capable of acting as a TNA node to serve as the relay UE.

According to some examples, logic flow 600 at block 608 may receive a first message including critical communication content via use of unicast or multicast delivery modes. For these examples, relay module 522-3 may receive the first message.

In some examples, logic flow 600 at block 610 may send the critical communication content in a second message over the direct link, the second message to be sent via use of unicast or multicast delivery modes. For these examples, relay module 522-3 may send the second message.

FIG. 7 illustrates an embodiment of a first storage medium. As shown in FIG. 7, the first storage medium includes storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
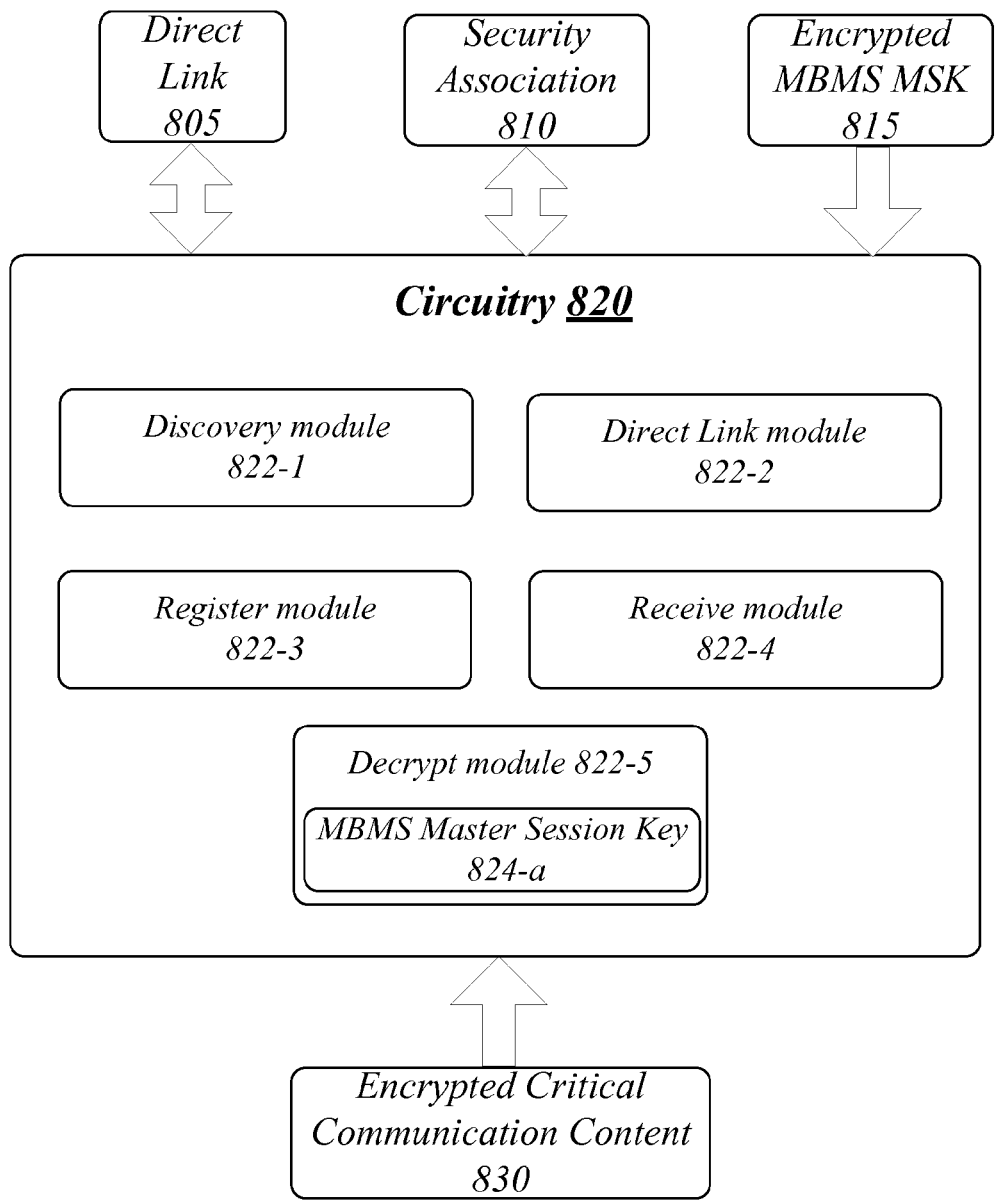
FIG. 8 illustrates an example block diagram for a second apparatus.

FIG. 8 illustrates a block diagram for an example second apparatus. As shown in FIG. 8, the example second apparatus includes apparatus 800. Although apparatus 800 shown in FIG. 8 has a limited number of elements in a certain topology, it may be appreciated that the apparatus 800 may include more or less elements in alternate topologies as desired for a given implementation.

The apparatus 800 may comprise an apparatus 800 having a circuitry 820 that may represent a portion of logic in hardware that may be generally arranged to execute one or more other portions of logic that may include modules 822-a. It is worthy to note that "a" and "b" and "c" and similar designators as used herein are intended to be variables representing any positive integer. Thus, for example, if an implementation sets a value for a=5, then a complete set of modules 822-a included in the one or more portions of logic may include modules 822-1, 822-2, 822-3, 822-4 or 822-5. The examples are not limited in this context.

According to some examples, apparatus 800 may be implemented in an UE (e.g., UE 150) capable of operating in compliance with one or more 3GPP LTE Specifications including LTE-A. The examples are not limited in this context.

In some examples, as shown in FIG. 8, apparatus 800 includes circuitry 820. Circuitry 820 can be any of various commercially available processors to include but not limited to the processors mentioned above for apparatus 500. Also, according to some examples, circuitry 820 may also be an ASIC and at least some modules 822-a may be implemented as hardware elements of the ASIC.

According to some examples, the logic of apparatus 800 may be included in a first UE (e.g., UE 150) and may include a discovery module 822-1. Discovery module 822-1 may be executed by circuitry 820 to discover a second UE (e.g., UE 140) capable of serving as a relay UE to or from a network arranged to provide critical communication services.

In some examples, the logic of apparatus 800 may also include a direct link module 822-2. Direct link module 822-2 may be executed by circuitry 820 to establish a direct link with a second UE responsive to mutual authentication with the second UE. For these examples, direct link 805 may represent the mutual authentication with the second UE (e.g., using ECCSI signature scheme).

According to some examples, the logic of apparatus 800 may also include a register module 822-3. Register module 822-3 may be executed by circuitry 820 to register for the critical communication services responsive to a security association with the network. For these examples, security association 810 may represent the security association with the network (e.g., using both the ECCSI signature scheme and SAKKE algorithm).

In some examples, the logic of apparatus 800 may also include a receive module 822-4. Receive module 822-4 may be executed by circuitry 820 to receive encrypted critical communication content originating from the network over the direct link with the second UE, the encrypted critical communication content sent from the second UE via use of unicast or multicast delivery modes. The encrypted critical communication content may be included in encrypted critical communication content 830. For these examples, encrypted MBMS MSK 815 may include an MBMS MSK that may have been encrypted using common key material that was obtain by register module 822-3 as part of the security association 810 with the network. The MBMS MSK may have been used by the network to encrypt the critical communication content.

According to some examples, the logic of apparatus 800 may also include a decrypt module 822-5. Decrypt module 822-5 may be executed by circuitry 820 to use the MBMS master session key to decrypt the encrypted critical communication content received by the receive module over the direct link with the second UE. In some examples, decrypt module 822-5 may maintain the MBMS MSK with MBMS master session key 824-a. MBMS master session key 824-a may be a data structure such as a lookup table (LUT).

Various modules of apparatus 800 and a device implementing apparatus 800 may be communicatively coupled to each other by various types of communications media to coordinate operations. The coordination may involve the uni-directional or bi-directional exchange of information. For instance, the modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 9 illustrates an example of a second logic flow. As shown in FIG. 9, the second logic flow include logic flow 900. Logic flow 900 may be representative of some or all of the operations executed by one or more logic, features, or devices described herein, such as apparatus 800. More particularly, logic flow 900 may be implemented by discovery module 822-1, direct link module 822-2, register module 822-3, receive module 822-4 or decrypt module 822-5.

In the illustrated example shown in FIG. 9, logic flow 900 at block 902 may discover, at a first UE, a second UE capable of serving as a relay UE to or from a network arranged to provide critical communication services. In some examples, discover module 822-1 may discover the second UE.

According to some examples, logic flow 900 at block 904 may establish a direct link with a second UE responsive to mutual authentication with the second UE. For these examples, direct link module 822-2 may establish the direct link.

In some examples, logic flow 900 at block 906 may register for the critical communication services responsive to a security association with the network. For these examples, register module 822-3 may register for the critical communication services.

According to some examples, logic flow 900 at block 908 may receive encrypted critical communication content originating from the network over the direct link via use of unicast or multicast delivery modes. For these examples, receive module 822-4 may receive the encrypted critical communication content. Also, decrypt module 822-5 may be capable of decrypting the encrypted critical communication content based on a previously received MBMS MSK that was received from the network.

FIG. 10 illustrates an embodiment of a second storage medium. As shown in FIG. 10, the second storage medium includes storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
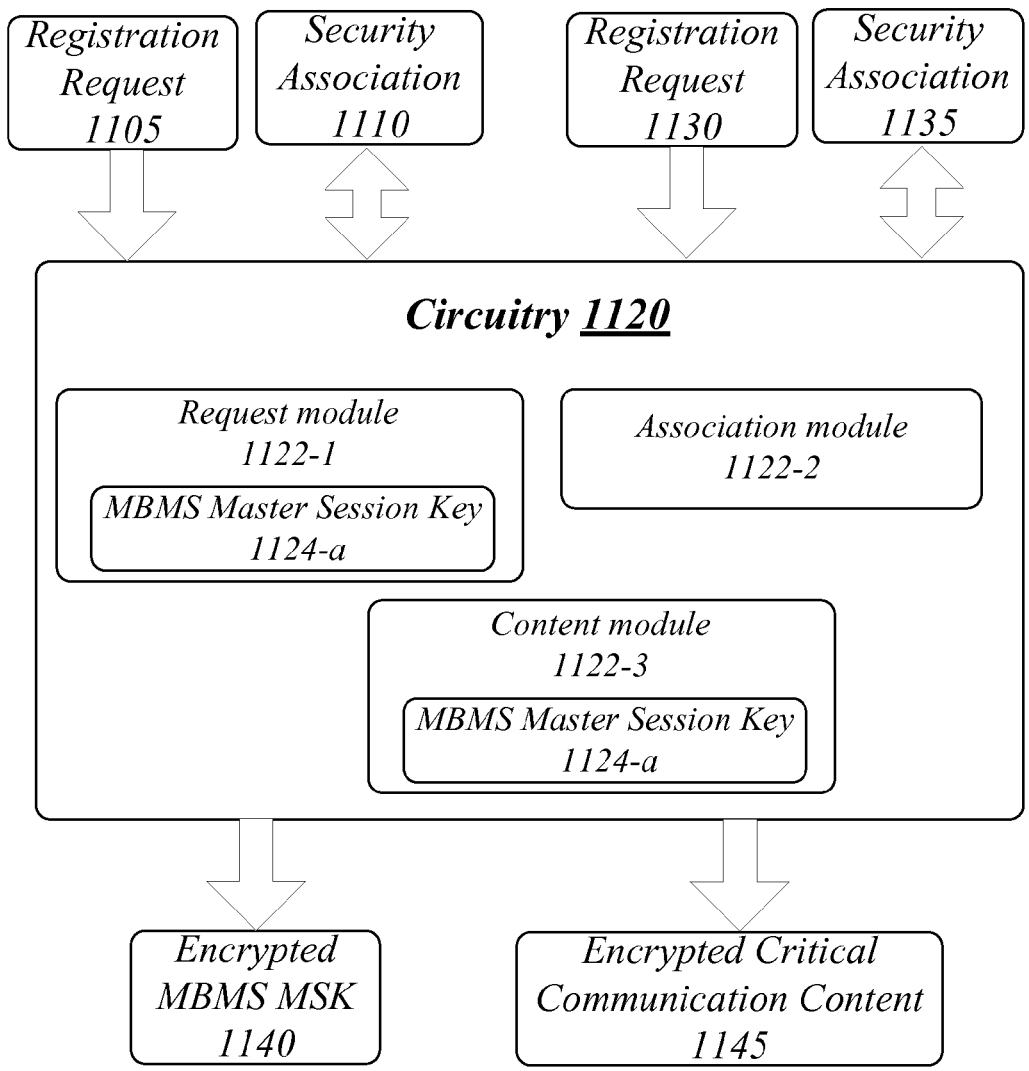
FIG. 11 illustrates an example block diagram for a third apparatus.

FIG. 11 illustrates a block diagram for an example third apparatus. As shown in FIG. 11, the example third apparatus includes apparatus 1100. Although apparatus 1100 shown in FIG. 11 has a limited number of elements in a certain topology, it may be appreciated that the apparatus 1100 may include more or less elements in alternate topologies as desired for a given implementation.

The apparatus 1100 may comprise an apparatus 1100 having a circuitry 1120 that may represent a portion of logic in hardware that may be generally arranged to execute one or more other portions of logic that may include modules 1122-*a*. It is worthy to note that "a" and "b" and "c" and similar designators as used herein are intended to be variables representing any positive integer. Thus, for example, if an implementation sets a value for a=3, then a complete set of modules 1122-*a* included in the one or more portions of logic may include modules 1122-1, 1122-2 or 1122-3. The examples are not limited in this context.

According to some examples, apparatus 1100 may be implemented in network equipment such as server (e.g., MCPTT server 120) for a network capable of providing critical communication services. The server may be capable of operating in compliance with one or more 3GPP LTE Specifications including LTE-A. The examples are not limited in this context.

In some examples, as shown in FIG. 11, apparatus 1100 includes circuitry 1120. Circuitry 1120 can be any of various commercially available processors to include but not limited to the processors mentioned above for apparatus 500. Also, according to some examples, circuitry 1120 may also be an ASIC and at least some modules 1122-*a* may be implemented as hardware elements of the ASIC.

According to some examples, apparatus 1100 may be included in a server (e.g., MCPTT 120) for a network capable of providing critical communication services to one or more UEs (e.g., UE 150). The logic of apparatus 1100 may include a request module 1122-1. Request module 1122-1 may be executed by circuitry 1120 to receive a first registration request 1105 from a first UE for the first UE to register for the critical communication services. For these examples, the registration request may be included in registration request 1105.

In some examples, the logic of apparatus 1100 may also include an association module 1122-2. Association module 1122-2 may be executed by circuitry 1120 to establish a first security association with the first UE (e.g., UE 140) responsive to first registration request. In some examples, security association 1110 may represent the security association with the first UE that may include mutual authentication and an agreement of common key material (e.g., using both the ECCSI signature scheme and SAKKE algorithm).

In some examples, request module 1122-1 may receive a second registration request 1130 from a second UE (UE 150). Second registration request 1130 may be relayed through the first UE that is capable of acting as a TNA node between the network and the second UE. For these examples, association module 1122-2 may then establish a second security association with the second UE responsive to second registration request 1130. In some examples, security association 1130 may represent the security association with the second UE that may include mutual authentication and an agreement of common key material. For these examples, request module 1122-1 may use common key material agreed upon during establishment of the second security association to send an encrypted MBMS MSK included in encrypted MBMS MSK 1140 to the second UE. Request module 1122-1 may maintain or have access to the MBMS MSK in MBMS master session key 1124-*a*. MBMS master session key 1124-*a* may be a data structure such as a lookup table.

According to some examples, the logic of apparatus 1100 may also include a content module 1122-3. Content module 1122-3 may be executed by circuitry 1120 to send encrypted critical communication content destined for the second UE via use of unicast or multicast delivery modes to the first UE. Content module 1122-3 may maintain or have access to the MBMS MSK in MBMS master session key 1124-*a* and may use the MBMS MSK to encrypt the critical communication content destined for the second UE. The encrypted critical communication content may be included in encrypted critical communication content 1145.

Various modules of apparatus 1100 and a device implementing apparatus 1100 may be communicatively coupled to each other by various types of communications media to coordinate operations. The coordination may involve the uni-directional or bi-directional exchange of information. For instance, the modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 12 illustrates an example of a third logic flow. As shown in FIG. 12, the third logic flow include logic flow 1200. Logic flow 1200 may be representative of some or all of the operations executed by one or more logic, features, or devices described herein, such as apparatus 800. More particularly, logic flow 1200 may be implemented by request module 1122-1, association module 1122-2 or content module 1122-3.

In the illustrated example shown in FIG. 12, logic flow 1200 at block 1202 may receive, at a server for a network providing critical communication services, a first registration request to register a first UE for the critical communication services. In some examples, request module 1122-1 may receive the first registration request.

According to some examples, logic flow 1200 at block 1204 may establish a first security association with the first UE responsive to the first registration request. For these examples, association module 1122-2 may establish the first security association.

In some examples, logic flow 1200 at block 1206 may receive a second registration request from a second UE to register the second UE for the critical communication services, the second registration request relayed through the first UE that is capable of acting as a TNA node between the network and the second UE. For these examples, request module 1122-1 may receive the second registration request.

According to some examples, logic flow 1200 at block 1208 may establish a second security association with the second UE responsive to the second registration request. For these examples, association module 1122-2 may establish the second security association.

In some examples, logic flow 1200 at block 1210 may send encrypted critical communication content destined for the second UE via use of unicast or multicast delivery modes to the first UE. For these examples, content module 1122-3 may send the encrypted critical communication content via use of unicast or multicast delivery modes to the first UE.

FIG. 13 illustrates an embodiment of a third storage medium. As shown in FIG. 13, the third storage medium includes storage medium 1300. Storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
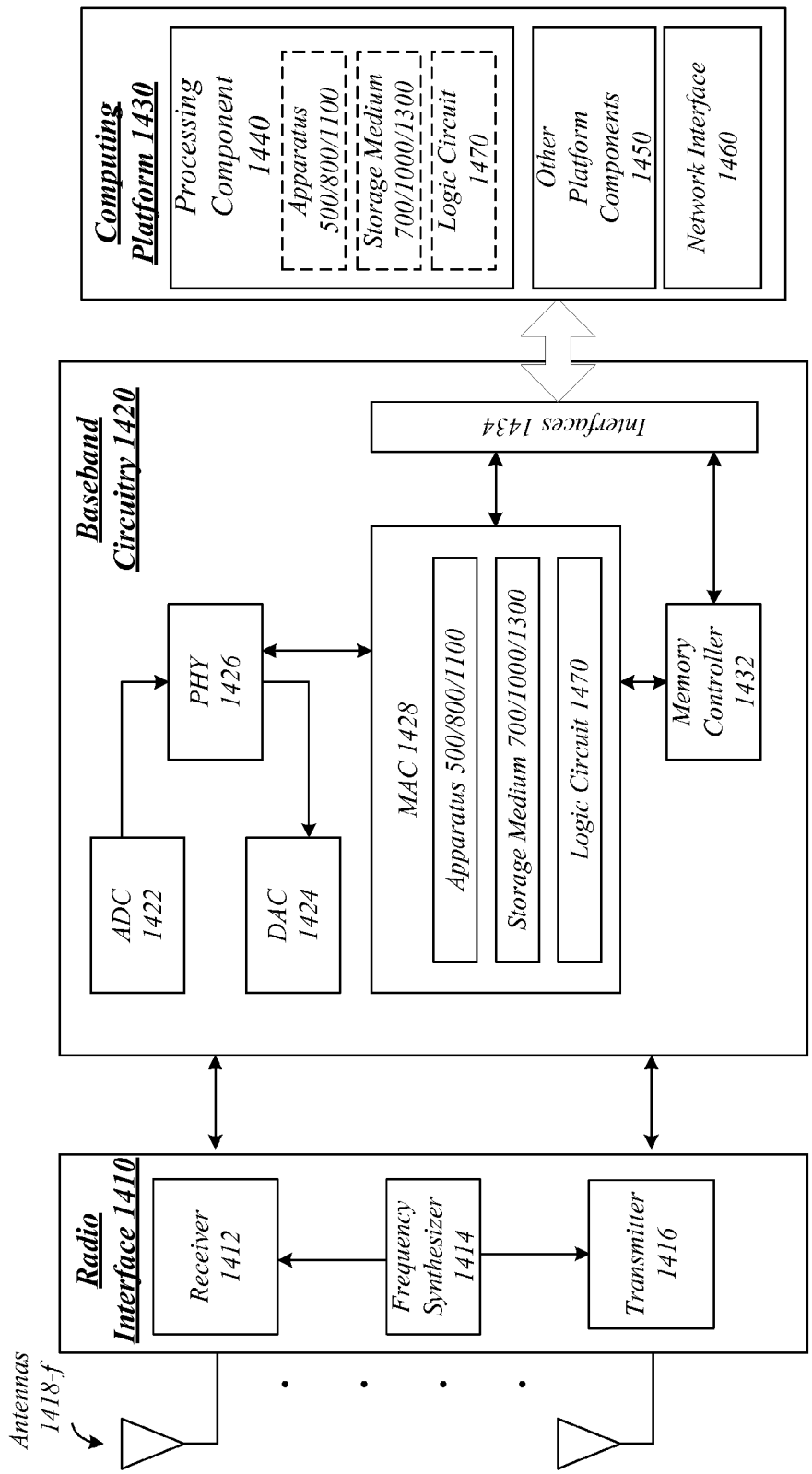
FIG. 14 illustrates an example of a device.

FIG. 14 illustrates an embodiment of a device 1400 for use in a broadband wireless access network. Device 1400 may implement, for example, apparatus 500/800/1100, storage medium 700/1000/1300 and/or a logic circuit 1470. The logic circuit 1470 may include physical circuits to perform operations described for apparatus 500/800/1100. As shown in FIG. 14, device 1400 may include a radio interface 1410, baseband circuitry 1420, and computing platform 1430, although examples are not limited to this configuration.

The device 1400 may implement some or all of the structure and/or operations for the apparatus 500/800/1100, storage medium 700/1000/1300 and/or logic circuit 1470 in a single computing entity, such as entirely within a single device. Alternatively, the device 1400 may distribute portions of the structure and/or operations for apparatus 500/800/1100, storage medium 700/1000/1300 and/or logic circuit 1470 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418-f. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with MAC processing circuit 1428 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames (e.g., containing subframes). Alternatively or in addition, MAC processing circuit 1428 may share processing for certain of these functions or perform these processes independent of PHY processing circuit 1426. In some embodiments, MAC and PHY processing may be integrated into a single circuit.

Computing platform 1430 may provide computing functionality for device 1400. As shown, computing platform 1430 may include a processing component 1440. In addition to, or alternatively of, baseband circuitry 1420 of device 1400 may execute processing operations or logic for apparatus 500/800/1100, storage medium 700/1000/1300, and logic circuit 1470 using the processing component 1430. Processing component 1440 (and/or PHY 1426 and/or MAC 1428) may comprise various hardware elements, software elements, or a combination of both. Examples of hardware elements may include devices, logic devices, components, processors, microprocessors, circuitry (e.g., circuitry 520, 820 or 1120), processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1430 may further include a network interface 1460. In some examples, network interface 1460 may include logic and/or features to support wireless network interfaces as described in one or more 3GPP LTE or LTE-A specifications or standards. For these examples, network interface 1460 may enable an apparatus 1500 or 1800 located at network equipment such as an MTC-IWF or SC.

Device 1400 may be, for example, a computer, a personal computer (PC), a desktop computer, a laptop computer, an ultrabook computer, a smartphone, a tablet computer, a notebook computer, a netbook computer, a work station, a mini-computer, multiprocessor system, processor-based system, wireless access point, or combination thereof. Accordingly, functions and/or specific configurations of device 1400 described herein, may be included or omitted in various embodiments of device 1400, as suitably desired. In some embodiments, device 1400 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1400 may be implemented using single input single output (SISO) architectures. However, certain implementations may include multiple antennas (e.g., antennas 1418-*f*) for transmission and/or reception using adaptive antenna techniques for beamforming or spatial division multiple access (SDMA) and/or using multiple input multiple output (MIMO) communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 15:
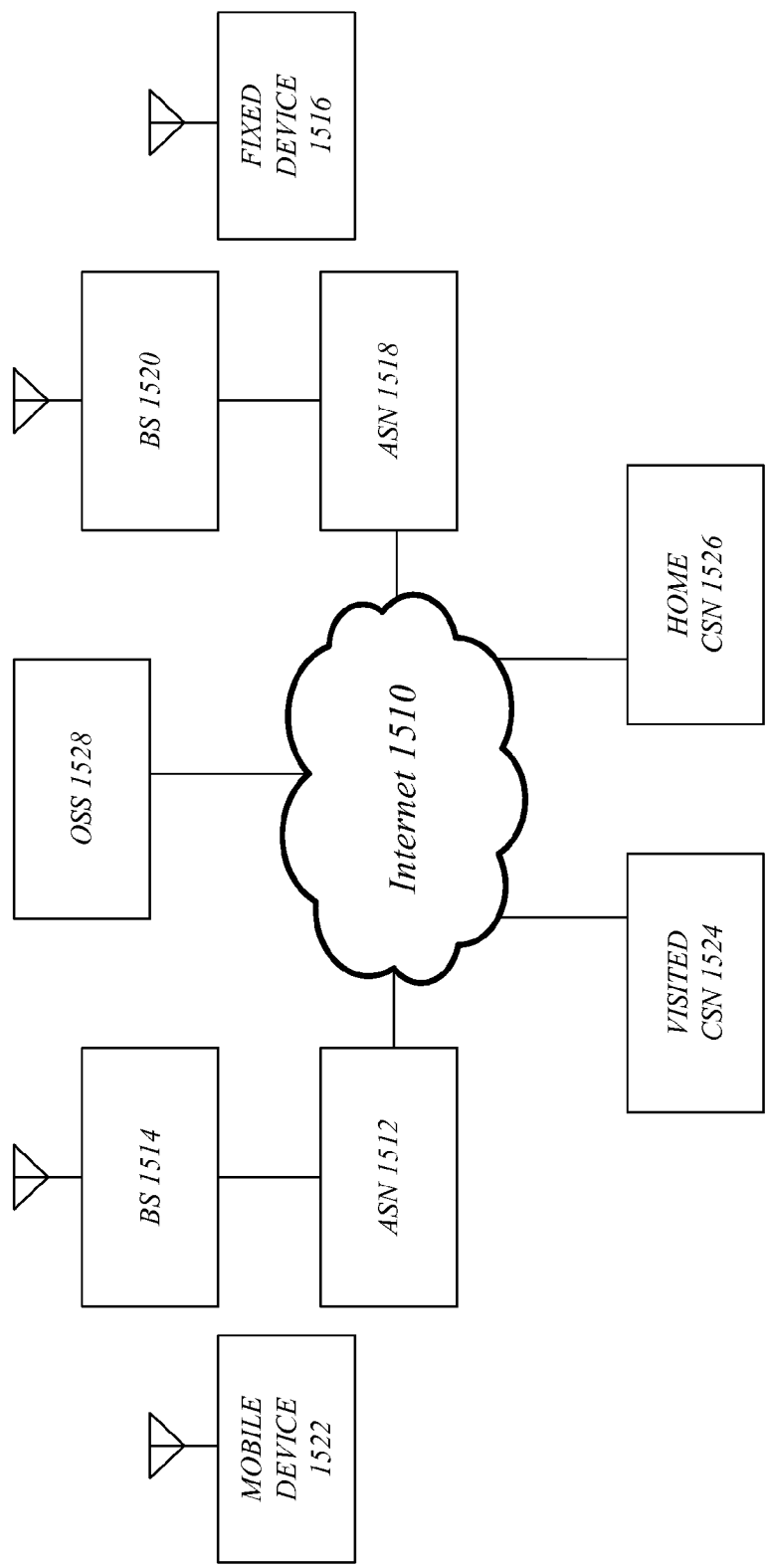
FIG. 15 illustrates an example of a broadband wireless access system.

FIG. 15 illustrates an embodiment of a broadband wireless access system 1500. As shown in FIG. 15, broadband wireless access system 1500 may be an internet protocol (IP) type network comprising an internet 1510 type network or the like that is capable of supporting mobile wireless access and/or fixed wireless access to internet 1510. In one or more embodiments, broadband wireless access system 1500 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1500, access service networks (ASN) 1514, 1518 are capable of coupling with base stations (BS) 1514, 1520 (RRHs or eNBs), respectively, to provide wireless communication between one or more fixed devices 1516 and internet 1510, or one or more mobile devices 1515 and Internet 1510. One example of a fixed device 1516 and a mobile device 1522 is UE 150 (see FIG. 1), with the fixed device 1516 comprising a stationary version of UE 150 and the mobile device 1522 comprising a mobile version of UE 150. ASN 1512 may implement profiles that are capable of defining the mapping of network functions to one or more physical entities on broadband wireless access system 1500. Base stations 1514, 1520 (or eNBs) may comprise radio equipment to provide RF communication with fixed device 1516 and mobile device 1522, such as described with reference to device 1500, and may comprise, for example, the PHY, MAC, RLC or PDCP layer equipment in compliance with a 3GPP LTE Specification or an IEEE 802.16 Standard. Base stations 1514, 1520 (or eNBs) may further comprise an IP backplane to couple to Internet 1510 via ASN 1512, 1518, respectively, although the scope of the claimed subject matter is not limited in these respects.

Broadband wireless access system 1500 may further comprise a visited connectivity service network (CSN) 1524 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1524 or home CSN 1526, and the scope of the claimed subject matter is not limited in these respects. Visited CSN 1524 may be referred to as a visited CSN in the case where visited CSN 1524 is not part of the regular service provider of fixed device 1516 or mobile device 1522, for example where fixed 1516 or mobile device 1522 is roaming away from their respective home CSN 1526, or where broadband wireless access system 1500 is part of the regular service provider of fixed device 1516 or mobile device 1522 but where broadband wireless access system 1500 may be in another location or state that is not the main or home location of fixed device 1516 or mobile device 1522.

Fixed device 1516 may be located anywhere within range of one or both base stations 1514, 1520, such as in or near a home or business to provide home or business customer broadband access to Internet 1510 via base stations 1514, 1520 and ASN 1512, 1518, respectively, and home CSN 1526. It is worthy to note that although fixed device 1516 is generally disposed in a stationary location, it may be moved to different locations as needed. Mobile device 1522 may be utilized at one or more locations if mobile device 1522 is within range of one or both base stations 1514, 1520, for example.

In accordance with one or more embodiments, operation support system (OSS) 1528 may be part of broadband wireless access system 1500 to provide management functions for broadband wireless access system 1500 and to provide interfaces between functional entities of broadband wireless access system 1500. Broadband wireless access system 1500 of FIG. 15 is merely one type of wireless network showing a certain number of the components of broadband wireless access system 1500, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include logic for a first UE capable of operating in compliance with one or more 3GPP LTE standards including LTE-A, at least a portion of the logic in hardware. The logic may include a register module to register for critical communication services responsive to a security association with a network arranged to provide the critical communication services. The logic may also include a direct link module to establish a direct link with a second UE responsive to mutual authentication with the second UE. The logic may also include a relay module to act as a TNA node between the network and the second UE to serve as a relay UE for the second UE, the relay module arranged to receive a first message that includes encrypted critical communication content via use of unicast or multicast delivery modes and send the encrypted critical communication content in a second message over the direct link. The second message may be sent via use of unicast or multicast delivery modes.

Example 2

The apparatus of example 1, the security association with the network may include mutual authentication and an agreement of common key material between the register module and the network.

Example 3

The apparatus of example 2, the mutual authentication may include implementing an ECCSI signature scheme.

Example 4

The apparatus of example 3, implementing the ECCSI signature scheme may include sending a SIP REGISTER message to the network. For these examples, the SIP REGISTER message may include a first ECCSI signature payload and an identifier for the first UE. Implementing the ECCSI signature scheme may also include receiving a SIP OK message from the network. The SIP OK message may include a second ECCSI signature payload and an identifier for the network.

Example 5

The apparatus of example 2, the agreement of common key material between the register module and the network may include the register module to receive common key material generated using a SAKKE algorithm.

Example 6

The apparatus of example 5, the common key material received as a SAKKE payload in a SIP OK message.

Example 7

The apparatus of example 1, the relay module may act as a TNA node to include relaying SIP messages using the security association with the network.

Example 8

The apparatus of example 1, the relay module may send the encrypted critical communication content in the second message to the second UE via use of a multicast delivery mode that may include the relay module to generate a multicast link-layer identifier specific to the encrypted critical communication content and provide the multicast link-layer identifier to the second UE a SIP message.

Example 9

The apparatus of example 8, the SIP message may include a SIP INFO message.

Example 10

The apparatus of example 1, the direct link may include a WLAN direct connection.

Example 11

The apparatus of example 1, the critical communication services may include mission critical communication services associated with an MCPTT server.

Example 12

The apparatus of example 1 may include a digital display to present a user interface view.

Example 13

An example method may include registering, at a first UE capable of operating in compliance with one or more 3GPP LTE standards including LTE-A, for critical communication services responsive to a security association with a network arranged to provide the critical communication services. The method may also include establishing a direct link with a second UE responsive to mutual authentication with the second UE. The method may also include acting as a TNA node between the network and the second UE to serve as a relay UE for the second UE. The method may also include receiving a first message including encrypted critical communication content via use of unicast or multicast delivery modes. The method may also include sending the encrypted critical communication content in a second message over the direct link, the second message to be sent via use of unicast or multicast delivery modes.

Example 14

The method of example 13, the security association with the network may include mutual authentication and an agreement of common key material between the first UE and the network.

Example 15

The method of example 14, mutual authentication may include implementing an ECCSI signature scheme.

Example 16

The method of example 15, implementing the ECCSI signature scheme for mutual authentication may include sending a SIP REGISTER message, the SIP REGISTER message including a first ECCSI signature payload and an identifier for the first UE. Implementing the ECCSI signature scheme for mutual authentication may also include receiving a SIP OK message, the SIP OK message including a second ECCSI signature payload and an identifier for the network.

Example 17

The method of example 14, the agreement of common key material may include receiving common key material generated using a SAKKE algorithm.

Example 18

The method of example 17 may include receiving the common key material as a SAKKE payload in a SIP OK message.

Example 19

The method of example 13, acting as a TNA node may include relaying SIP messages using the security association with the network.

Example 20

The method of example 13, sending the encrypted critical communication content in the second message to the second UE via use of a multicast delivery mode. Sending the encrypted critical communication content in the second message may include generating a multicast link-layer identifier specific to the encrypted critical communication content and providing the multicast link-layer identifier to the second UE in a SIP message.

Example 21

The method of example 20, the SIP message may include a SIP INFO message.

Example 22

The method of claim 13, the direct link may include a WLAN direct connection.

Example 23

The method of example 13, the critical communication services may include mission critical communication services associated with an MCPTT server.

Example 24

An example at least one non-transitory machine readable medium comprising a plurality of instructions that in response to being executed on a system at UE may cause the system to carry out a method according to any one of examples 13 to 23.

Example 25

An example apparatus may include means for performing the methods of any one of examples 13 to 23.

Example 26

An example at least one non-transitory machine readable medium may include a plurality of instructions that in response to being executed on a system for a first UE capable of operating in compliance with one or more or more 3GPP LTE standards including LTE-A, causes the system to register for critical communication services responsive to a security association with a network arranged to provide the critical communication services. The instructions may also cause the system to establish a direct link with a second UE responsive to mutual authentication with the second UE. The instructions may also cause the system to act as a TNA node between the network and the second UE to serve as a relay UE for the second UE. The instructions may also cause the system to receive a first message including encrypted critical communication content via use of unicast or multicast delivery modes. The instructions may also cause the system to send the encrypted critical communication content in a second message over the direct link, the second message to be sent via use of unicast or multicast delivery modes.

Example 27

The at least one non-transitory machine readable medium of example 26, the security association with the network may include mutual authentication and an agreement of common key material between the first UE and the network.

Example 28

The at least one non-transitory machine readable medium of example 27, the mutual authentication may include the instructions to further cause the system to implement an ECCSI signature scheme.

Example 29

The at least one non-transitory machine readable medium of example 28, the instruction may cause the system to implement the ECCSI signature scheme for mutual authentication may include the instructions to further cause the system to send a SIP REGISTER message, the SIP REGISTER message including a first ECCSI signature payload and an identifier for the first UE. The instruction may further cause the system to receive a SIP OK message, the SIP OK message including a second ECCSI signature payload and an identifier for the network.

Example 30

The at least one non-transitory machine readable medium of example 27, the agreement of common key material may include the instructions to further cause the system to receive common key material generated using a SAKKE algorithm.

Example 31

The at least one non-transitory machine readable medium of example 30, the instructions may further cause the system to receive the common key material as a SAKKE payload in a SIP OK message.

Example 32

The at least one non-transitory machine readable medium of example 26, to act as a TNA node may include the instructions to cause the system to relay SIP messages using the security association with the network.

Example 33

The at least one non-transitory machine readable medium of example 26, to send the encrypted critical communication content in the second message to the second UE via use of a multicast delivery mode, may include the instructions to further cause the system to generate a multicast link-layer identifier specific to the encrypted critical communication content. For these examples, the instructions may further cause the system to provide the multicast link-layer identifier to the second UE in a SIP message.

Example 34

The at least one non-transitory machine readable medium of example 33, the second message may include a SIP INFO message.

Example 35

The at least one non-transitory machine readable medium of example 26, the direct link may include a WLAN direct connection.

Example 36

The at least one non-transitory machine readable medium of example 26, the critical communication services may include mission critical communication services associated with an MCPTT server.

Example 37

An example apparatus may include logic for a first UE capable of operating in compliance with one or more 3GPP LTE standards including LTE-A, at least a portion of the logic in hardware. The logic may include a discovery module to discover a second UE capable of serving as a relay UE to or from a network arranged to provide critical communication services. The logic may also include a direct link module to establish a direct link with the second UE responsive to mutual authentication with the second UE. The logic may also include a register module to register for the critical communication services responsive to a security association with the network. The logic may also include a receive module to receive encrypted critical communication content originating from the network over the direct link via use of unicast or multicast delivery modes.

Example 38

The apparatus of example 37, the security association with the network may include mutual authentication and an agreement of common key material between the register module and the network.

Example 39

The apparatus of example 38, mutual authentication may include implementing an ECCSI signature scheme.

Example 40

The apparatus of example 39, implementing the ECCSI signature scheme may include sending a SIP REGISTER message to the network, the SIP REGISTER message to include a first ECCSI signature payload and an identifier for the first UE. Implementing the ECCSI signature scheme may also include receiving a SIP OK message from the network, the SIP OK message to include a second ECCSI signature payload and an identifier for the network.

Example 41

The apparatus of example 38, the agreement of common key material between the register module and the network may include the register module arranged to receive common key material generated using a SAKKE algorithm.

Example 42

The apparatus of example 41, the common key material may be received as a SAKKE payload in a SIP OK message.

Example 43

The apparatus of example 42, the receive module may receive a message from the second UE over the direct link. The message may enable decryption of the encrypted critical communication content via use of an MBMS master session key.

Example 44

The apparatus of example 43, the message may include a SIP INFO message that includes the MBMS master session key and a corresponding TMGI. The MBMS master session key may be encrypted based on the common key material.

Example 45

The apparatus of example 43, the logic may also include a decrypt module arranged to use the MBMS master session key to decrypt the encrypted critical communication content.

Example 46

The apparatus of example 37, the receive module may receive a message over the direct link that enables use of a multicast delivery mode to receive the encrypted critical communication content. The message may include a multicast link-layer identifier specific to encrypted critical communication content to be sent over the direct link.

Example 47

The apparatus of example 46, the message may include a SIP INFO message.

Example 48

The apparatus of example 37, the direct link may include a WLAN direct connection.

Example 49

The apparatus of example 37, the critical communication services may include mission critical communication services associated with an MCPTT server.

Example 50

The apparatus of example 37, may include a digital display to present a user interface view.

Example 51

An example method may include discovering, at a first UE capable of operating in compliance with one or more 3GPP LTE standards including LTE-A, a second UE capable of serving as a relay UE to or from a network arranged to provide critical communication services. The method may also include establishing a direct link with the second UE responsive to mutual authentication with the second UE. The method may also include registering for the critical communication services responsive to a security association with the network. The method may also include receiving encrypted critical communication content originating from the network over the direct link via use of unicast or multicast delivery modes.

Example 52

The method of example 51, the security association with the network may include mutual authentication and an agreement of common key material between the first UE and the network.

Example 53

The method of example 52, mutual authentication may include implementing an ECCSI signature scheme.

Example 54

The method of example 53, implementing the ECCSI signature scheme may include sending a SIP REGISTER message to the network, the SIP REGISTER message to include a first ECCSI signature payload and an identifier for the first UE. Implementing the ECCSI signature scheme may also include receiving a SIP OK message from the network, the SIP OK message to include a second ECCSI signature payload and an identifier for the network.

Example 55

The method of example 52, the agreement of common key material may include receiving common key material generated using a SAKKE algorithm.

Example 56

The method of example 55, may include receiving the common key material as a SAKKE payload in a SIP OK message.

Example 57

The method of example 51, may include receiving a message from the second UE over the direct link. The message may enable decryption of the encrypted critical communication content via use of an MBMS master session key.

Example 58

The method of example 57, the message may include a SIP INFO message that includes the MBMS master session key and a corresponding TMGI. The MBMS master session key may be encrypted based on the common key material.

Example 59

The method of example 58, may include decrypting the encrypted critical communication content using the MBMS master session key.

Example 60

The method of example 51, may include receiving a message over the direct link that enables use of a multicast delivery mode to receive the encrypted critical communication content. The message may include a multicast link-layer identifier specific to encrypted critical communication content to be sent over the direct link.

Example 61

The method of example 60, the message may include a SIP INFO message.

Example 62

The method of example 51, the direct link may include a WLAN direct connection.

Example 63

The method of example 51, the critical communication services may include mission critical communication services associated with an MCPTT server.

Example 64

An example at least one non-transitory machine readable medium may include a plurality of instructions that in response to being executed on a system at user equipment (UE) may cause the system to carry out a method according to any one of examples 51 to 63.

Example 65

An example apparatus may include means for performing the methods of any one of examples 51 to 63.

Example 66

At least one non-transitory machine readable medium may include a plurality of instructions that in response to being executed on a system for a first UE capable of operating in compliance with one or more 3GPP LTE standards including LTE-A that may cause the system to discover a second UE capable of serving as a relay UE to or from a network arranged to provide critical communication services. The instructions may also cause the system to establish a direct link with the second UE responsive to mutual authentication with the second UE. The instructions may also cause the system to register for the critical communication services responsive to a security association with the network. The instructions may also cause the system to receive encrypted critical communication content originating from the network over the direct link via use of unicast or multicast delivery modes.

Example 67

The at least one non-transitory machine readable medium of example 66, the security association with the network may include mutual authentication and an agreement of common key material between the first UE and the network.

Example 68

The at least one non-transitory machine readable medium of example 67, mutual authentication with the network may include the instructions to further cause the system to implement an ECCSI signature scheme.

Example 69

The at least one non-transitory machine readable medium of example 68, the instruction may cause the system to implement the ECCSI signature scheme may include the instructions to further cause the system to send a SIP REGISTER message to the network, the SIP REGISTER message including a first ECCSI signature payload and an identifier for the first UE. The instruction may further cause the system to receive a SIP OK message from the network, the SIP OK message including a second ECCSI signature payload and an identifier for the network.

Example 70

The at least one non-transitory machine readable medium of example 67, the agreement of common key material may include the instructions to further cause the system to receive common key material generated using a SAKKE algorithm.

Example 71

The at least one non-transitory machine readable medium of example 70, the instructions to further cause the system to receive the common key material as a SAKKE payload in a SIP OK message.

Example 72

The at least one non-transitory machine readable medium of example 66, the instructions may further cause the system to receive a message from the second UE over the direct link, the message to enable decryption of the encrypted critical communication content via use of an MBMS master session key.

Example 73

The at least one non-transitory machine readable medium of example 72, the message may include a SIP INFO message relayed from the network that includes the MBMS master session key and a corresponding TMGI. The MBMS master session key may be encrypted based on the common key material.

Example 74

The at least one non-transitory machine readable medium of example 73, the instructions may further cause the system to decrypt the received encrypted critical communication content via use of the MBMS master session key.

Example 75

The at least one non-transitory machine readable medium of example 66, the instructions may further cause the system to receive a message over the direct link that enables use of a multicast delivery mode to receive the encrypted critical communication content, the message to include a multicast link-layer identifier specific to the encrypted critical communication content to be sent on the direct link.

Example 76

The at least one non-transitory machine readable medium of example 75, the message may include a SIP INFO message.

Example 77

The at least one non-transitory machine readable medium of example 66, the direct link may include a WLAN direct connection.

Example 78

The at least one non-transitory machine readable medium of example 66, the critical communication services may include mission critical communication services associated with an MCPTT server.

Example 79

An example apparatus may include logic at a server for a network providing critical communication services, at least a portion of the logic in hardware. The logic may include a request module to receive a first registration request to register a first UE for the critical communication services. The logic may also include an association module to establish a first security association with the first UE responsive to the first registration request. The logic may also include the request module to receive a second registration request from a second UE to register the second UE for the critical communication services, the second registration request relayed through the first UE that is capable of acting as a TNA node between the network and the second UE. The logic may also include the association module to establish a second security association with the second UE responsive to the second registration request. The logic may also include a content module to send encrypted critical communication content destined for the second UE via use of unicast or multicast delivery modes to the first UE.

Example 80

The apparatus of example 79, the first security association with the first UE and the second security association with the second UE including respective mutual authentications and agreements of common key material.

Example 81

The apparatus of example 80, the respective mutual authentications may include the association module implementing an ECCSI signature scheme.

Example 82

The apparatus of example 81, implementing the ECCSI signature scheme may include receiving a SIP REGISTER messages from the first UE including a first ECCSI signature payload and an identifier for the first UE. Implementing the ECCSI signature scheme may also include receiving a SIP REGISTER message from the second UE including a second ECCSI signature payload and an identifier for the second UE. Implementing the ECCSI signature scheme may also include causing separate SIP OK messages to be sent to the first and second UEs, a first SIP OK message sent to the first UE to include a third ECCSI signature payload and an identifier for the server. A second SIP OK message sent to the second UE may include a fourth ECCSI signature payload and the identifier for the server.

Example 83

The apparatus of example 80, the respective agreements of common key material may include the authentication module to generate a first common key material for the first UE and a second common key material for the second UE. The authentication module may also separately encrypt the first and second common key material using a SAKKE algorithm and cause the encrypted first common key material to be sent in a first SIP OK message to the first UE and the encrypted second common key material to be sent in a second SIP OK message to the second UE.

Example 84

The apparatus of example 83, the first UE capable of acting as the TNA node may include the first UE arranged to relay SIP messages between the second UE and the server by use of the first security association established with the association module.

Example 85

The apparatus of example 84, may include the request module to encrypt an MBMS master session key using the second common key material. The request module may also cause the encrypted MBMS master session key to be sent to the second UE in a SIP INFO message. The SIP INFO message may also include a TMGI. The SIP INFO message may be routed through the first UE acting as the TNA node. The second UE may be capable of decrypting the encrypted MBMS master session key via use of the second common key material and using the MBMS master session key to decrypt encrypted critical communication content sent by the content module.

Example 86

The apparatus of example 79, the critical communication services may include mission critical communication services and the server is an MCPTT server. For these examples, the content module may send the encrypted critical communication content as part of providing the mission critical communication services.

Example 87

The apparatus of example 79, may include a digital display to present a user interface view.

Example 88

An example method may include receiving, at a server for a network providing critical communication services, a first registration request to register a first UE for the critical communication services. The method may also include establishing a first security association with the first UE responsive to the first registration request. The method may also include receiving a second registration request from a second UE to register the second UE for the critical communication services. The second registration request may be relayed through the first UE that is capable of acting as a TNA node between the network and the second UE. The method may also include establishing a second security association with the second UE responsive to the second registration request. The method may also include sending encrypted critical communication content destined for the second UE via use of unicast or multicast delivery modes to the first UE.

Example 89

The method of example 88, the first security association with the first UE and the second security association with the second UE may include respective mutual authentications and agreements of common key material.

Example 90

The method of example 89, the respective mutual authentications may include implementing an ECCSI signature scheme.

Example 91

The method of example 90, implementing the ECCSI signature scheme may include receiving a SIP REGISTER message from the first UE including a first ECCSI signature payload and an identifier for the first UE. Implementing the ECCSI signature scheme may also include receiving a SIP REGISTER message from the second UE including a second ECCSI signature payload and an identifier for the second UE. Implementing the ECCSI signature scheme may also include sending separate SIP OK messages to the first and second UEs, a first SIP OK message sent to the first UE to include a third ECCSI signature payload and an identifier for the server. A second SIP OK message may be sent to the second UE to include a fourth ECCSI signature payload and the identifier for the server.

Example 92

The method of example 89, the respective agreements of common key material may include generating a first common key material for the first UE and a second common key material for the second UE. The respective agreements of common key material may also include separately encrypting the first and second common key material using a SAKKE algorithm. The respective agreements of common key material may also include sending the encrypted first common key material in a first SIP OK message to the first UE and the encrypted second common key material in a second SIP OK message to the second UE.

Example 93

The method of example 88, the first UE capable of acting as the TNA node may include the first UE arranged to relay SIP messages between the second UE and the server by use of the first security association.

Example 94

The method of example 93, may include encrypting an MBMS master session key using the second common key material causing the encrypted MBMS master session key to be sent to the second UE in a SIP INFO message. The SIP INFO message may also include a TMGI. The SIP INFO message may be routed through the first UE acting as the TNA node. The second UE may be capable of decrypting the encrypted MBMS master session key via use of the second common key material and using the MBMS master session key to decrypt sent encrypted critical communication content.

Example 95

The method of example 88, the critical communication services may include mission critical communication services and the server is an MCPTT server. The encrypted critical communication content may be sent as part of providing the mission critical communication services.

Example 96

An example at least one non-transitory machine readable medium may include a plurality of instructions that in response to being executed on a system at a server for a network providing critical communication services to one or more UEs may cause the system to carry out a method according to any one of examples 88 to 95.

Example 97

An example apparatus may include means for performing the methods of any one of examples 88 to 95.

Example 98

An example at least one non-transitory machine readable medium may include a plurality of instructions that in response to being executed on a system for a server for a network providing critical communication services may cause the system to receive a first registration request to register a first UE for the critical communication services. The instructions may also cause the system to receive a second registration request from a second UE to register the second UE for the critical communication services. The second registration request may be relayed through the first UE that is capable of acting as a TNA node between the network and the second UE. The instructions may also cause the system to establish a second security association with the second UE responsive to the second registration request. The instructions may also cause the system to send encrypted critical communication content destined for the second UE via use of unicast or multicast delivery modes to the first UE.

Example 99

The at least one non-transitory machine readable medium of example 98, the first security association with the first UE and the second security association with the second UE may include respective mutual authentications and agreements of common key material.

Example 100

The at least one non-transitory machine readable medium of example 99, the respective mutual authentications with the first and second UEs may include implementing an ECCSI signature scheme.

Example 101

The at least one non-transitory machine readable medium of example 100, implementing the ECCSI signature scheme may include receiving a SIP REGISTER messages from the first UE including a first ECCSI signature payload and an identifier for the first UE. Implementing the ECCSI signature scheme may also include receiving a SIP REGISTER message from the second UE including a second ECCSI signature payload and an identifier for the second UE. Implementing the ECCSI signature scheme may also include causing separate SIP OK messages to be sent to the first and second UEs. A first SIP OK message may be sent to the first UE to include a third ECCSI signature payload and an identifier for the server. A second SIP OK message may be sent to the second UE to include a fourth ECCSI signature payload and the identifier for the server.

Example 102

The at least one non-transitory machine readable medium of example 101, the separate agreements of common key material may include generating a first common key material for the first UE and a second common key material for the second UE. The separate agreements of common key material may also include separately encrypting the first and second common key material using a SAKKE algorithm. The separate agreements of common key material may also include causing the encrypted first common key material to be sent in a first SIP OK message to the first UE and the encrypted second common key material to be sent in a second SIP OK message to the second UE.

Example 103

The at least one non-transitory machine readable medium of example 102, the first UE capable of acting as the TNA node may include the first UE arranged to relay SIP messages between the second UE and the server by use of the first security association.

Example 104

The at least one non-transitory machine readable medium of example 103, the instructions to further cause the system to encrypt an MBMS master session key via use of the second common key material and cause the encrypted MBMS master session key to be sent to the second UE in a SIP INFO message. The SIP INFO message may also include a TMGI. The SIP INFO message may be routed through the first UE acting as the TNA node. The second UE may be capable of decrypting the encrypted MBMS master session key via use of the second common key material and using the MBMS master session key to decrypt received encrypted critical communication content sent by the server.

Example 105

The at least one non-transitory machine readable medium of example 98, the critical communication services may include mission critical communication services and the server may be an MCPTT server. The encrypted critical communication content may be sent as part of providing the mission critical communication services.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the examples. In addition, in the foregoing Detailed Description, it can be seen that various features are grouped together in a single example for the purpose of streamlining the disclosure.

This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "may include" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
circuitry for a first user equipment (UE) operating in compliance with one or more $3^{rd}$ Generation Partnership Project (3GPP) Long Term Evolution (LTE) standards including LTE-Advanced (LTE-A), the circuitry to execute logic, at least a portion of which is in hardware, the logic to:
discover a second UE serving as a relay UE to or from a network arranged to provide critical communication services through a mission critical push to talk (MCPTT) server;
establish a direct link with the second UE responsive to mutual authentication with the second UE that includes implementation of an elliptic curve-based certificate-less signatures for identity-based encryption (ECCSI) signature scheme, implementation of the ECCSI signature scheme includes the logic to:
send a session initiation protocol (SIP) REGISTER message to the MCPTT server, the SIP REGISTER message to include a first ECCSI signature payload and an identifier for the first UE; and
receive a SIP OK message from the MCPTT server, the SIP OK message to include a second ECCSI signature payload and an identifier for the MCPTT server;
register for the critical communication services responsive to a security association with the MCPTT server that includes mutual authentication and an agreement of common key material between the first UE and the MCPTT server; and
receive encrypted message content associated with the critical communication services over the direct link via use of unicast or multicast delivery modes, the encrypted message content originating from the network.

2. The apparatus of claim 1, comprising the logic to receive a message over the direct link that enables use of a multicast delivery mode to receive the encrypted message content, the message to include a multicast link-layer identifier specific to encrypted message content to be sent over the direct link.

3. The apparatus of claim 2, the message to comprise a session initiation protocol (SIP) INFO message.

4. The apparatus of claim 1, the encrypted message content comprises encrypted critical communication content.

5. The apparatus of claim 1, comprising a digital display to present a user interface view.

6. At least one non-transitory machine readable medium comprising a plurality of instructions that in response to being executed on a system for a first user equipment (UE) operating in compliance with one or more or more $3^{rd}$ Generation Partnership Project (3GPP) Long Term Evolution (LTE) standards including LTE-Advanced (LTE-A), causes the system to:
register for critical communication services responsive to a security association with a mission critical push to talk (MCPTT) server for a network arranged to provide the critical communication services through the MCPTT server, the security association to include mutual authentication and an agreement of common key material between the first UE and the MCPTT server;
establish a direct link with a second UE responsive to mutual authentication with the second UE that includes implementation of an elliptic curve-based certificateless signatures for identity-based encryption (ECCSI) signature scheme, the implementation of the ECCSI signature scheme to cause the system to:
send a session initiation protocol (SIP) REGISTER message, the SIP REGISTER message including a first ECCSI signature payload and an identifier for the first UE; and
receive a SIP OK message, the SIP OK message including a second ECCSI signature payload and an identifier for the MCPTT server;
act as a trusted node authentication (TNA) node between the MCPTT server and the second UE to serve as a relay UE for the second UE;
receive a first message including encrypted message content associated with the critical communication services via use of unicast or multicast delivery modes; and
send the encrypted message content in a second message over the direct link, the second message to be sent via use of unicast or multicast delivery modes.

7. The at least one non-transitory machine readable medium of claim 6, to act as a TNA node to comprise the instructions to cause the system to relay session initiation protocol (SIP) messages using the security association with the MCPTT server.

8. The at least one non-transitory machine readable medium of claim 6, to send the encrypted message content in the second message to the second UE via use of a multicast delivery mode, comprises the instructions to further cause the system to:
generate a multicast link-layer identifier specific to the encrypted message content; and
provide the multicast link-layer identifier to the second UE in a session initiation protocol (SIP) message.

9. The at least one non-transitory machine readable medium of claim 8, the SIP message to comprise a SIP INFO message.

10. The at least one non-transitory machine readable medium of claim 6, the encrypted message content comprises encrypted critical communication content.

11. A method comprising:
receiving, at a mission critical push to talk (MCPTT) server for a network providing critical communication services through the MCPTT server, a first registration request to register a first user equipment (UE) for the critical communication services;
establishing a first security association with the first UE responsive to the first registration request, the first security association to include a mutual authentication and an agreement of common key material between the first UE and the MCPTT server;
receiving a second registration request from a second UE to register the second UE for the critical communication services, the second registration request relayed through the first UE that is acting as a trusted node authentication (TNA) node between the network and the second UE;
establishing a second security association with the second UE responsive to the second registration request, the second security association to include a mutual authentication and an agreement of common key material between the second UE and the MCPTT server, wherein the respective mutual authentications for the first security association and the second security association include implementation of an elliptic curve-based certificateless signatures for identity-based encryption (ECCSI) signature scheme that includes:
receiving a session initiation protocol (SIP) REGISTER message from the first UE including a first ECCSI signature payload and an identifier for the first UE;
receiving a SIP REGISTER message from the second UE including a second ECCSI signature payload and an identifier for the second UE; and
sending separate SIP OK messages to the first and second UEs, a first SIP OK message sent to the first UE to include a third ECCSI signature payload and an identifier for the MCPTT server, a second SIP OK message sent to the second UE to include a fourth ECCSI signature payload and the identifier for the MCPTT server; and
sending encrypted message content associated with the critical communication services to the second UE, the encrypted message content sent via use of unicast or multicast delivery modes to the first UE.

12. The method of claim 11, the encrypted message content comprises encrypted critical communication content sent as part of providing the mission critical communication services through the MCPTT server.

13. An apparatus comprising:
circuitry for a first user equipment (UE) operating in compliance with one or more $3^{rd}$ Generation Partnership Project (3GPP) Long Term Evolution (LTE) standards including LTE-Advanced (LTE-A), the circuitry to execute logic, at least a portion of which is in hardware, the logic to:
discover a second UE serving as a relay UE to or from a network arranged to provide critical communication services through a mission critical push to talk (MCPTT) server;
establish a direct link with the second UE responsive to mutual authentication with the second UE;
register for the critical communication services responsive to a security association with the MCPTT server that includes mutual authentication and an agreement of common key material between the first UE and the MCPTT server, the agreement of common key material to include the first UE to receive common key material generated using a Sakai-Kasahara key encryption (SAKKE) algorithm, the common key material received as a SAKKE payload in a session initiation protocol (SIP) OK message; and receive encrypted message content associated with the critical communication services over the direct link via use of unicast or multicast delivery modes, the encrypted message content originating from the network.

14. The apparatus of claim 13, the logic to receive a message from the second UE over the direct link, the message to enable decryption of the encrypted message content via use of a multimedia broadcast/multicast service (MBMS) master session key.

15. The apparatus of claim 14, the message to comprise a SIP INFO message that includes the MBMS master session key and a corresponding temporary mobile group identity (TMGI), the MBMS master session key encrypted based on the common key material.

16. The apparatus of claim 15, further comprising the logic to:
use the MBMS master session key to decrypt the encrypted message content.

17. The apparatus of claim 13, comprising the logic to receive a message over the direct link that enables use of a multicast delivery mode to receive the encrypted message content, the message to include a multicast link-layer identifier specific to encrypted message content to be sent over the direct link.

18. The apparatus of claim 17, the message to comprise a session initiation protocol (SIP) INFO message.

19. The apparatus of claim 13, the encrypted message content comprises encrypted critical communication content.

20. At least one non-transitory machine readable medium comprising a plurality of instructions that in response to being executed on a system for a first user equipment (UE) operating in compliance with one or more or more $3^{rd}$ Generation Partnership Project (3GPP) Long Term Evolution (LTE) standards including LTE-Advanced (LTE-A), causes the system to:
register for critical communication services responsive to a security association with a mission critical push to talk (MCPTT) server for a network arranged to provide the critical communication services through the MCPTT server, that includes mutual authentication and an agreement of common key material between the first UE and the MCPTT server, the agreement of common key material to include the first UE to receive common key material generated using a Sakai-Kasahara key encryption (SAKKE) algorithm, the common key material received as a SAKKE payload in a session initiation protocol (SIP) OK message;
establish a direct link with a second UE responsive to mutual authentication with the second UE;
act as a trusted node authentication (TNA) node between the MCPTT server and the second UE to serve as a relay UE for the second UE;
receive a first message including encrypted message content associated with the critical communication services via use of unicast or multicast delivery modes; and
send the encrypted message content in a second message over the direct link, the second message to be sent via use of unicast or multicast delivery modes.

21. The at least one non-transitory machine readable medium of claim 20, to act as a TNA node to comprise the instructions to cause the system to relay session initiation protocol (SIP) messages using the security association with the MCPTT server.

22. The at least one non-transitory machine readable medium of claim 20, to send the encrypted message content in the second message to the second UE via use of a multicast delivery mode, comprises the instructions to further cause the system to:
generate a multicast link-layer identifier specific to the encrypted message content; and
provide the multicast link-layer identifier to the second UE in a session initiation protocol (SIP) message.

23. The at least one non-transitory machine readable medium of claim 22, the SIP message to comprise a SIP INFO message.

24. The at least one non-transitory machine readable medium of claim 20, the encrypted message content comprises encrypted critical communication content.

25. A method comprising:
receiving, at a mission critical push to talk (MCPTT) server for a network providing critical communication services through the MCPTT server, a first registration request to register a first user equipment (UE) for the critical communication services;
establishing a first security association with the first UE responsive to the first registration request, the first security association to include a mutual authentication and an agreement of common key material between the first UE and the MCPTT server;
receiving a second registration request from a second UE to register the second UE for the critical communication services, the second registration request relayed through the first UE that is acting as a trusted node authentication (TNA) node between the network and the second UE;
establishing a second security association with the second UE responsive to the second registration request, the second security association to include a mutual authentication and an agreement of common key material between the second UE and the MCPTT server, wherein the respective agreement of common key material between the first and second UEs and the MCPTT server includes:
generating a first common key material for the first UE and a second common key material for the second UE;
separately encrypting the first and second common key material using a Sakai-Kasahara key encryption (SAKKE) algorithm; and
sending the encrypted first common key material in a first session initiation protocol (SIP) OK message to the first UE and the encrypted second common key material in a second SIP OK message to the second UE; and
sending encrypted message content associated with the critical communication services to the second UE, the encrypted message content sent via use of unicast or multicast delivery modes to the first UE.

26. The method of claim 25, the first UE acting as the TNA node comprises the first UE arranged to relay session initiation protocol (SIP) messages between the second UE and the MCPTT server by use of the first security association.

27. The method of claim 26, comprising:
encrypting a multimedia broadcast/multicast service (MBMS) master session key using the second common key material; and
causing the encrypted MBMS master session key to be sent to the second UE in a SIP INFO message, the SIP INFO message also including a temporary mobile group identity (TMGI), the SIP INFO message routed through the first UE acting as the TNA node, the second UE decrypting the encrypted MBMS master session key via use of the second common key material and using the MBMS master session key to decrypt sent encrypted message content.

28. The method of claim 25, the encrypted message content comprises encrypted critical communication content sent as part of providing the critical communication services through the MCPTT server.

* * * * *